US012022878B2

(12) United States Patent
Akao et al.

(10) Patent No.: US 12,022,878 B2
(45) Date of Patent: Jul. 2, 2024

(54) FLAVOR GENERATION SYSTEM, METHOD, AND PROGRAM

(71) Applicant: JAPAN TOBACCO INC., Tokyo (JP)

(72) Inventors: Takeshi Akao, Tokyo (JP); Takashi Oda, Tokyo (JP); Takuma Nakano, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 708 days.

(21) Appl. No.: 17/172,073

(22) Filed: Feb. 10, 2021

(65) Prior Publication Data

US 2021/0161211 A1    Jun. 3, 2021

Related U.S. Application Data

(63) Continuation of application No. PCT/JP2018/030243, filed on Aug. 13, 2018.

(51) Int. Cl.
*A24F 47/00* (2020.01)
*A24F 40/40* (2020.01)
(Continued)

(52) U.S. Cl.
CPC .............. *A24F 40/51* (2020.01); *A24F 40/40* (2020.01); *A24F 40/53* (2020.01); *A24F 40/90* (2020.01);
(Continued)

(58) Field of Classification Search
CPC .......... A24F 40/51; A24F 40/40; A24F 40/53; A24F 40/90; A24F 40/10; H01M 10/44;
(Continued)

(56) References Cited

U.S. PATENT DOCUMENTS 5,994,875 A     11/1999  Lee
2013/0162197 A1  6/2013  Takahashi et al.
(Continued)

FOREIGN PATENT DOCUMENTS

EP    3 698 658 A1    8/2020
EP    3 804 543 A1    4/2021
(Continued)

OTHER PUBLICATIONS

International Search Report and Written Opinion dated Oct. 23, 2018, received for PCT Application PCT/JP2018/030243, Filed on Aug. 13, 2018, 11 pages including English Translation.
(Continued)

*Primary Examiner* — Abdullah A Riyami
*Assistant Examiner* — Nelson R. Burgos-Guntin
(74) *Attorney, Agent, or Firm* — XSENSUS LLP

(57) ABSTRACT

A favor generation system includes: a power source unit (110) that includes a power source (10) that is electrically connected to or connectable to a load (121R) for atomizing an aerosol source or heating a flavor source, and a first controller (50); and a charging unit (200) that includes a second controller (250) and that is capable of charging the power source. The first controller and the second controller are configured to be capable of controlling a charging speed of the power source. In the control of the charging speed, a first object to be operated by the first controller is different from a second object to be operated by the second controller.

20 Claims, 15 Drawing Sheets

(51) Int. Cl.
*A24F 40/51* (2020.01)
*A24F 40/53* (2020.01)
*A24F 40/90* (2020.01)
*H01M 10/44* (2006.01)
*H02J 7/00* (2006.01)
*H02J 7/04* (2006.01)

(52) U.S. Cl.
CPC ........... *H01M 10/44* (2013.01); *H02J 7/0047* (2013.01); *H02J 7/04* (2013.01); *H01M 2220/30* (2013.01); *H02J 2207/20* (2020.01)

(58) Field of Classification Search
CPC ........... H01M 2220/30; H01M 10/425; H01M 10/443; H01M 10/486; H02J 7/0047; H02J 7/04; H02J 2207/20; H02J 7/00309; H02J 7/0031; H02J 7/00712; H02J 7/007192; Y02E 60/10
See application file for complete search history.

(56) References Cited

U.S. PATENT DOCUMENTS

| | | | |
|---|---|---|---|
| 2016/0278436 A1* | 9/2016 | Verleur | H05B 3/44 |
| 2016/0309788 A1* | 10/2016 | Hawes | A61M 15/06 |
| 2016/0324216 A1* | 11/2016 | Li | A61M 15/06 |
| 2016/0338407 A1* | 11/2016 | Kerdemelidis | A24F 40/60 |
| 2016/0374397 A1* | 12/2016 | Jordan | H02J 7/0042 |
| | | | 131/329 |
| 2017/0020196 A1* | 1/2017 | Cameron | A24F 40/60 |
| 2017/0033568 A1 | 2/2017 | Holzherr | |
| 2017/0035110 A1* | 2/2017 | Keen | A61M 11/042 |
| 2017/0042251 A1* | 2/2017 | Yamada | H05B 1/0244 |
| 2017/0119052 A1* | 5/2017 | Williams | H05B 3/44 |
| 2017/0150753 A1* | 6/2017 | Macko | H05B 1/0244 |
| 2017/0150757 A1* | 6/2017 | Worm | H05B 1/0244 |
| 2017/0181223 A1* | 6/2017 | Sur | H05B 3/0014 |
| 2017/0188627 A1* | 7/2017 | Sur | G01V 3/08 |
| 2017/0196263 A1* | 7/2017 | Sur | H05B 1/0244 |
| 2017/0207499 A1 | 7/2017 | Leadley | |
| 2017/0208863 A1* | 7/2017 | Davis | F16K 7/00 |
| 2017/0215476 A1* | 8/2017 | Dickens | A24B 15/167 |
| 2017/0251723 A1* | 9/2017 | Kobal | A24B 15/00 |
| 2017/0258133 A1* | 9/2017 | Ampolini | H02J 7/00 |
| 2017/0265524 A1* | 9/2017 | Cadieux | H05B 3/42 |
| 2017/0294804 A1* | 10/2017 | Sur | H02J 7/0034 |
| 2017/0303591 A1* | 10/2017 | Cameron | H05B 1/0244 |
| 2017/0311644 A1* | 11/2017 | Collett | A24F 40/70 |
| 2017/0324118 A1 | 11/2017 | Ishishita | |
| 2017/0325502 A1* | 11/2017 | Nelson | A24F 40/70 |
| 2017/0332702 A1* | 11/2017 | Cameron | A24F 40/65 |
| 2017/0338670 A1 | 11/2017 | Zhang et al. | |
| 2017/0347709 A1 | 12/2017 | Laakso et al. | |
| 2017/0347714 A1* | 12/2017 | Metz | H05B 3/48 |
| 2017/0360091 A1* | 12/2017 | Bless | H02K 7/116 |
| 2017/0367402 A1* | 12/2017 | Lau | A24F 40/485 |
| 2017/0367403 A1* | 12/2017 | Karles | B65D 81/264 |
| 2017/0367405 A1* | 12/2017 | Zhu | H05B 1/0227 |
| 2017/0368273 A1* | 12/2017 | Rubin | A61M 16/0093 |
| 2018/0062423 A1 | 3/2018 | Zhang et al. | |

FOREIGN PATENT DOCUMENTS

| | | |
|---|---|---|
| JP | 10-70848 A | 3/1998 |
| JP | 2009-183105 A | 8/2009 |
| JP | 2011-98577 A | 5/2011 |
| JP | 2013-115889 A | 6/2013 |
| JP | 2013-149609 A | 8/2013 |
| JP | 2016-105672 A | 6/2016 |
| JP | 2017-5830 A | 1/2017 |
| JP | 2017-518733 A | 7/2017 |
| JP | 2018-519775 A | 7/2018 |

OTHER PUBLICATIONS

Extended European search report dated Jun. 4, 2021, in corresponding European patent Application No. 18930183.1, 13 pages.

* cited by examiner

FLAVOR GENERATION SYSTEM, METHOD, AND PROGRAM

CROSS REFERENCE TO RELATED APPLICATION

The present application is a continuation application of International Application No. PCT/JP2018/030243, filed on Aug. 13, 2018.

TECHNICAL FIELD

The present invention relates to a flavor generation system, a method of controlling the flavor generation system, and a program.

BACKGROUND ART

In place of cigarettes, aerosol generation devices are known which generate aerosol for tasting by atomizing an aerosol source with an electric load such as a heater (PTL 1). The aerosol generation device includes a heating element that atomizes an aerosol source, a power source that supplies electric power to the heating element, and a controller that controls the load and the power source.

PTL 1 also discloses a method of charging a power source provided in the aerosol generation device or discharging the electric power from the power source. The method disclosed in PTL 1 includes a step of determining a rate of a charging current or a discharging current in dependence on an ambient temperature, and a step of charging the power source or discharging the electric power from the power source at the determined rate.

PTL 2 discloses a charging system for charging a secondary battery. The charging system disclosed in PTL 2 includes a temperature detection unit that detects a temperature of the secondary battery. When the temperature of the secondary battery detected by the temperature detection unit is within a range of preferred temperature preset as a temperature suitable for charge of the secondary battery, the charging current to be supplied from a charging unit to the second battery is adjusted so that the temperature of the secondary battery does not exceed an upper temperature of the preferred temperature range.

PTL 3 discloses a charger for charging a battery in a battery pack. In a charging method disclosed in PTL 3, it is determined whether a charging current is output, based on a detected value of a temperature of the battery and a detected value of a temperature of the charger.

CITATION LIST

Patent Literature

PTL 1: National Publication of International Patent Application No. 2017-518733
PTL 2: Japanese Patent Laid-Open No. 2009-183105
PTL 3: Japanese Patent Laid-Open No. 2017-005830

SUMMARY OF INVENTION

A first feature is a favor generation system including: a power source unit that includes a power source that is electrically connected to or connectable to a load for atomizing an aerosol source or heating a flavor source, and a first controller; and a charging unit that includes a second controller and that is capable of charging the power source. The first controller and the second controller are configured to be capable of controlling a charging speed of the power source. In the control of the charging speed, a first object to be operated by the first controller is different from a second object to be operated by the second controller.

A second feature is the flavor generation system according to the first feature, including a sensor capable of outputting a detected value or an estimated value of a state of the power source. The first controller is configured to control the charging speed based on an output value of the sensor.

The sensor capable of outputting the detected value or the estimated value of the state of the power source may be, for example, a temperature sensor that measures or estimates a temperature of the power source or a sensor that measures or estimates an internal resistance of the power source.

A third feature is the flavor generation system according to the first or second feature, wherein the charging speed includes "0."

A fourth feature is the flavor generation system according to any one of the first to third features, wherein the power source unit includes a first connection portion capable of being electrically connected to the charging unit, and a switch between the power source and the first connection portion, and the first controller is configured to control the charging speed to be set to "0" or not by operating the switch.

A fifth feature is the flavor generation system according to the fourth feature, wherein the power source unit includes a first temperature sensor that outputs a detected value or an estimated value of a temperature of the power source, and the first controller is configured to control the charging speed to be set to "0" or not by operating the switch, based on an output value of the first temperature sensor.

A sixth feature is the flavor generation system according to the fifth feature, wherein the power source includes an electrolytic solution or an ionic liquid. The first controller is configured to open the switch in a case where the output value of the first temperature sensor is equal to or lower than a predetermined temperature, which causes solidification of the electrolytic solution or the ionic liquid, or in a case where the temperature of the power source is estimated to be equal to or lower than the predetermined temperature based on the output value of the first temperature sensor.

A seventh feature is the flavor generation system according to the fifth feature, wherein the power source is a lithium-ion secondary battery, and the first controller is configured to open the switch in a case where the output value of the first temperature sensor is equal to or lower than a predetermined temperature at which electrodeposition occurs on an electrode in the power source, or in a case where the temperature of the power source is estimated to be equal to or lower than the predetermined temperature based on the output value of the first temperature sensor.

An eighth feature is the flavor generation system according to the fifth feature, wherein the first controller is configured to open the switch in a case where the output value of the first temperature sensor is equal to or higher than a predetermined temperature at which a change in structure or composition of an electrode occurs in the power source, or in a case where the temperature of the power source is estimated to be equal to or higher than the predetermined temperature based on the output value of the first temperature sensor.

A ninth feature is the flavor generation system according to any one of the first to eighth features, wherein the charging unit includes a conversion unit that is capable of converting a voltage or a current of input electric power and outputting the converted voltage or current, and the second controller is configured to be capable of adjusting a value of the voltage or the current to be output from the conversion unit by operating the conversion unit.

A tenth feature is the flavor generation system according to the ninth feature, wherein the charging unit includes a second temperature sensor, and the second controller is configured to be capable of adjusting the value of the voltage or the current to be output from the conversion unit by operating the conversion unit, based on an output value of the second temperature sensor.

An eleventh feature is the flavor generation system according to the tenth feature, wherein the second controller is capable of acquiring a value related to a remaining amount of the power source, and the second controller is configured to be capable of adjusting the value of the voltage or the current to be output from the conversion unit by operating the conversion unit, based on the value related to the remaining amount of the power source and the output value of the second temperature sensor.

A twelfth feature is the flavor generation system according to the tenth or eleventh feature, wherein the conversion unit is configured to be capable of performing a first charging mode, and a second charging mode in which a value of electric power or a current per unit time that can be output by the conversion unit is greater than that in the first charging mode, and the second controller is configured to cause the conversion unit to perform the second charging mode in a case where the output value of the second temperature sensor is equal to or higher than a threshold, and cause the conversion unit to perform the first charging mode in a case where the output value of the second temperature sensor is lower than the threshold.

A thirteenth feature is the flavor generation system according to any one of the tenth to twelfth features, wherein the second controller is configured to perform constant current charging and constant voltage charging in a case where the output value of the temperature sensor is equal to or higher than a threshold, and perform only the constant current charging out of the constant current charging and the constant voltage charging in a case where the output value of the temperature sensor is lower than the threshold.

A fourteenth feature is the flavor generation system according to any one of the tenth to twelfth features, wherein the second controller is configured so that a switching value which is a value related to the remaining amount of the power source when the constant current charging is switched to the constant voltage charging in a case where the output value of the temperature sensor is lower than a threshold is smaller than the switching value in a case where the output value of the temperature sensor is equal to or higher than the threshold.

A fifteenth feature is the flavor generation system according to the first feature, wherein the power source unit includes a first sensor, the charging unit includes a second sensor, the first sensor and the second sensor are configured to output values related to the same physical quantity, respectively, the first controller is configured to control the charging speed based on an output value of the first sensor, and the second controller is configured to control the charging speed based on an output value of the second sensor.

A sixteenth feature is the flavor generation system according to the first feature, wherein the power source unit includes a first sensor, the charging unit includes a second sensor, the first sensor and the second sensor are configured to output values related to physical quantities different from each other, respectively, the first controller is configured to control the charging speed based on an output value of the first sensor, and the second controller is configured to control the charging speed based on an output value of the second sensor.

A seventeenth feature is the flavor generation system according to the first feature, wherein the power source unit includes a first connection portion capable of being electrically connected to the charging unit, and a switch between the power source and the first connection portion, the charging unit includes a conversion unit that is capable of converting a current or a voltage of input electric power and outputting the converted current or voltage, the second controller is configured to be capable of performing a second control to adjust a value of the voltage or the current to be output from the conversion unit by operating the conversion unit, the first controller is configured to perform a first control to control the charging speed to be set to "0" or not by operating the switch, and the charging speed is controlled by the first control and the second control.

An eighteenth feature is the flavor generation system according to the seventeenth feature, wherein the power source unit includes a first temperature sensor that outputs a detected value or an estimated value of a temperature of the power source, the charging unit includes a second temperature sensor, the first controller is configured to perform the first control based on an output value of the first temperature sensor, and the second controller is configured to perform the second control based on an output value of the second temperature sensor.

A nineteenth feature is the flavor generation system according to the first feature, wherein the first controller is configured to control an amount of current or electric power to be reduced or not, the current or electric power to be input to the power source from the charging unit.

A twentieth feature is the flavor generation system according to any one of the first to nineteenth features, wherein the first controller and the second controller is configured to control a charge of the power source without communicating with each other.

A twenty-first feature is the flavor generation system according to any one of the first to twentieth features, wherein the power source unit and the charging unit are electrically connected to each other only by a main positive bus and a main negative bus.

A twenty-second feature is a method of charging a power source that is electrically connected to or connectable to a load for atomizing an aerosol source or heating a flavor source, the method including the steps of: controlling a charging speed of the power source by operating a first object provided in a power source unit including the power source; and controlling the charging speed by operating a second object different from the first object, the second object being provided in the charging unit.

A twenty-third feature is a flavor generation system including: a power source unit that includes a power source that is electrically connected to or connectable to a load for atomizing an aerosol source or heating a flavor source, and a first controller; and an external unit that includes a second controller and that receives electric power output from the power source. The first controller and the second controller are configured to be capable of controlling a discharging speed from the power source. In the control of the discharging speed, an object to be operated by the first controller is different from an object to be operated by the second controller.

Here, the external unit may be, for example, an atomization unit or flavor unit that includes an aerosol source or a flavor source, or may be another unit.

A twenty-fourth feature is a method of discharging electric power to an external unit from a power source that is electrically connected to or connectable to a load for atomizing an aerosol source or heating a flavor source, the method including the steps of: controlling a discharging speed of the power source by operating a first object provided in a power source unit including the power source; and controlling the discharging speed by operating a second object different from the first object, the second object being provided in the external unit.

Here, the external unit may be, for example, an atomization unit or flavor unit that includes an aerosol source or a flavor source, or may be another unit.

A twenty-fifth feature is a flavor generation system including: a power source unit that includes a power source that is electrically connected to or connectable to a load for atomizing an aerosol source or heating a flavor source, and a first controller; and an external unit that includes a second controller. The first controller and the second controller are configured to control a charge of the power source by the external unit or a discharge of electric power from the power source to the external unit. Out of determinations to be made in the charge or the discharge, the number of first options for the determination to be made by the first controller is smaller than the number of second options for the determinations to be made by the second controller.

Here, the external unit may be, for example, an atomization unit or flavor unit that includes an aerosol source or a flavor source, may be a charging unit capable of charging the power source, or may be another unit.

A twenty-sixth feature is a method of charging, by an external unit, a power source that is electrically connected to or connectable to a load for atomizing an aerosol source or heating a flavor source or discharging electric power from the power source to the external unit, the method including the steps of: selecting one among first options by a first controller provided in a power source unit including the power source; and selecting one among second options by a second controller provided in the external unit. The number of the first options is smaller than the number of the second options.

Here, the external unit may be, for example, an atomization unit or flavor unit that includes an aerosol source or a flavor source, may be a charging unit capable of charging the power source, or may be another unit.

A twenty-seventh feature is a flavor generation system including: a power source unit that includes a power source that is electrically connected to or connectable to a load for atomizing an aerosol source or heating a flavor source, a first controller, and a first temperature sensor that outputs a detected value or an estimated value of a temperature of the power source; and a charging unit that includes a second controller and the second temperature sensor, and that is capable of charging the power source. The first controller is configured to provide a first correlation for setting a charging condition of the power source based on an output value of the first temperature sensor. The second controller is configured to provide a second correlation for setting a charging condition of the power source, the second correlation being different from the first correlation, based on an output value of the second temperature sensor. The first controller and the second controller are configured to control a charge of the power source based on the first correlation and the second correlation.

A twenty-eighth feature is the flavor generation system according to the twenty-seventh feature, wherein the first controller and the second controller are configured to control a charge of the power source by preferentially using the first correlation out of the first correlation and the second correlation.

A twenty-ninth feature is a method of charging a power source that is electrically connected to or connectable to a load for atomizing an aerosol source or heating a flavor source, the method including the steps of: acquiring an output value from a first temperature sensor provided in a power source unit including the power source; acquiring an output value from a second temperature sensor provided in a charging unit; and controlling a charge of the power source using a first correlation for setting a charging condition of the power source based on the output value of the first temperature sensor, and a second correlation for setting a charging condition of the power source based on the output value of the second temperature sensor.

A thirtieth feature is a program for causing a flavor generation system to execute the method according to the twenty-second, twenty-fourth, twenty-sixth or twenty-ninth feature.

DESCRIPTION OF EMBODIMENTS

Figure 1:
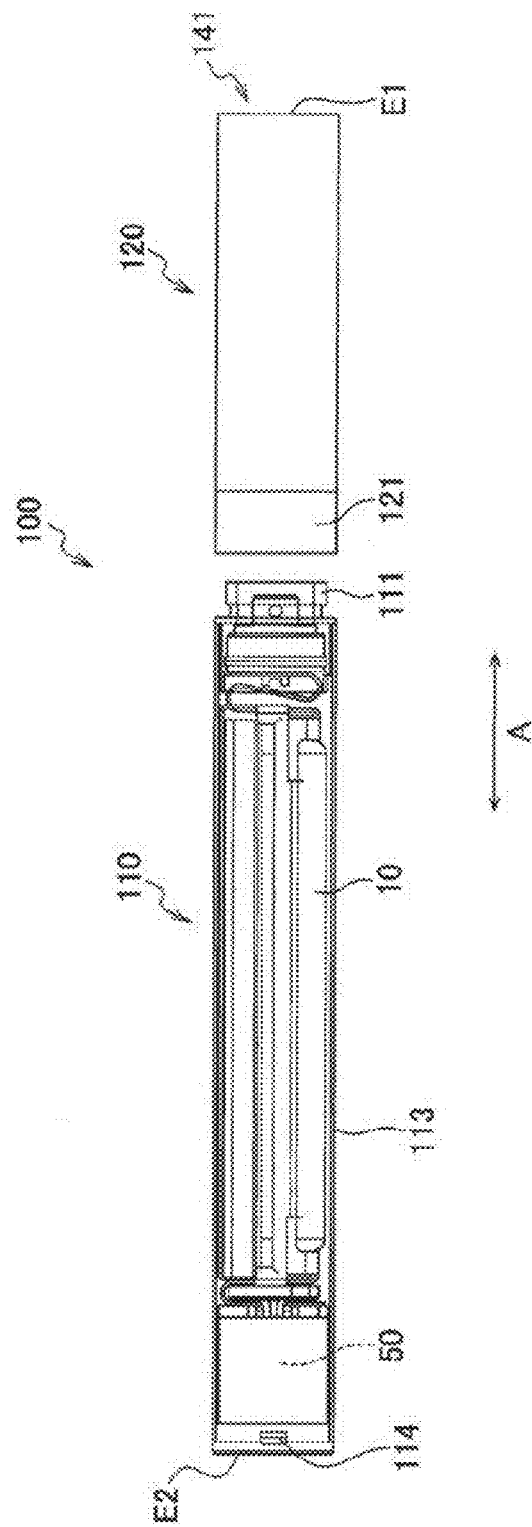
FIG. 1 is an exploded view illustrating a flavor generation device according to one embodiment.

Hereinafter, embodiments will be described. Note that the same or similar parts are denoted by the same or similar reference signs in the description of the drawings below.

However, it should be noted that the drawings are schematic and each ratio in dimension may be different from an actual ratio.

Therefore, specific dimensions and the like should be determined with reference to the following description. Needless to say, the drawings may include parts which are different, in terms of the relation or ratio in dimension, from each other.

Overview of Disclosure

According to one aspect, a flavor generation system includes: a power source unit that includes a power source that is electrically connected to or connectable to a load for atomizing an aerosol source or heating a flavor source, and a first controller; and a charging unit that includes a second controller and that is capable of charging the power source. The first controller and the second controller are configured to be capable of controlling a charging speed of the power source. In the control of the charging speed, a first object to be operated by the first controller is different from a second object to be operated by the second controller.

According to this aspect, the first controller of the power source unit and the second controller of the charging unit share the control of the charging speed of the power source. In particular, the first controller of the power source unit provided with the power source can be in charge of a part of the control of the charging speed. Therefore, more sophisticated and highly accurate control of the charging speed is made possible according to a state (environment) of the power source, for example. In particular, more sophisticated and highly accurate control of the charging speed is made possible without communication between the first controller of the power source unit and the second controller of the charging unit.

According to another aspect, a flavor generation system includes: a power source unit that includes a power source that is electrically connected to or connectable to a load for atomizing an aerosol source or heating a flavor source, and a first controller; and an external unit that includes a second controller and that receives electric power output from the power source. The first controller and the second controller are configured to be capable of controlling a discharging speed from the power source. In the control of the discharging speed, an object to be operated by the first controller is different from an object to be operated by the second controller.

According to this aspect, the first controller of the power source unit and the second controller of the external unit share the control of the discharging speed of the power source. In particular, the second controller of the external unit can be in charge of a part of the control of the discharging speed. Therefore, more sophisticated and highly accurate control of the discharging speed is made possible according to a state (environment) of the external unit, for example. In particular, more sophisticated and highly accurate control of the discharging speed is made possible without communication between the first controller of the power source unit and the second controller of the external unit.

According to still another aspect, a flavor generation system includes: a power source unit that includes a power source that is electrically connected to or connectable to a load for atomizing an aerosol source or heating a flavor source, and a first controller; and an external unit that includes a second controller. The first controller and the second controller are configured to control a charge of the power source by the external unit or a discharge of electric power from the power source to the external unit. Out of determinations to be made in the charge or the discharge, the number of first options for the determination to be made by the first controller is smaller than the number of second options for the determinations to be made by the second controller.

According to this aspect, the following advantages are provided in addition to the above-described advantages. Since the number of first options for determination to be made by the first controller of the power source unit is smaller than the number of second options for determination to be made by the external unit, the first controller of the power source unit has a simpler configuration than that of the second controller of the external unit. In this way, the sizes and weights of the first controller and the power source unit including the first controller can be reduced, which is, particularly, more suitable for a portable flavor generation system.

According to yet another aspect, a flavor generation system includes: a power source unit that includes a power source that is electrically connected to or connectable to a load for atomizing an aerosol source or heating a flavor source, a first controller, and a first temperature sensor that outputs a detected value or an estimated value of a temperature of the power source; and a charging unit that includes a second controller and the second temperature sensor, and that is capable of charging the power source. The first controller is configured to provide a first correlation for setting a charging condition of the power source based on an output value of the first temperature sensor. The second controller is configured to provide a second correlation for setting a charging condition of the power source, the second correlation being different from the first correlation, based on an output value of the second temperature sensor. The first controller and the second controller are configured to control a charge of the power source based on the first correlation and the second correlation.

According to this aspect, the first controller of the power source unit and the second controller of the charging unit share the charge control of the power source. In particular, since the first controller and the second controller control the charge of the power source based on the correlations (first correlation and second correlation) different from each other, the first controller and the second controller can perform more complex control according to various states (environment) of the power source, for example. In particular, sophisticated control of the charge is made possible without communication between the first controller of the power source unit and the second controller of the charging unit.

EMBODIMENTS

Figure 2:
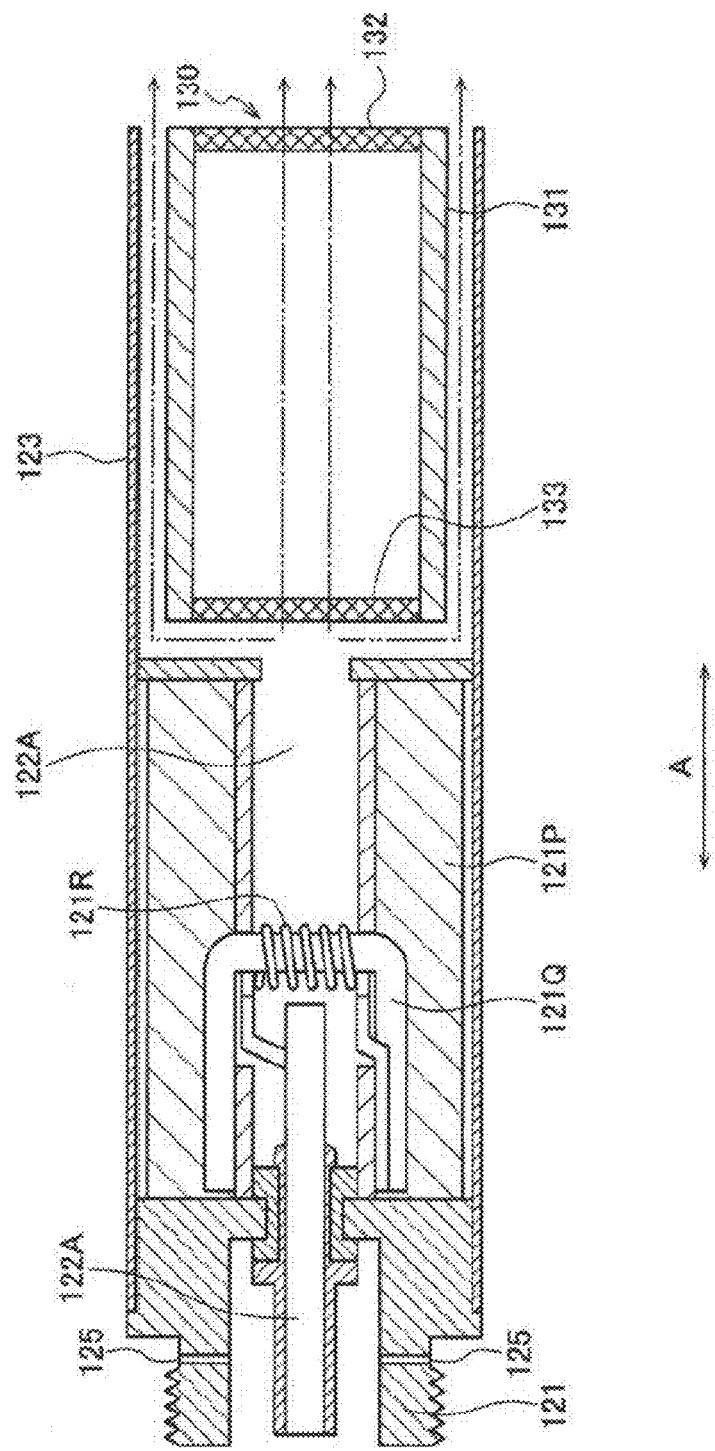
FIG. 2 is a diagram illustrating an atomization unit according to one embodiment.
Figure 3:
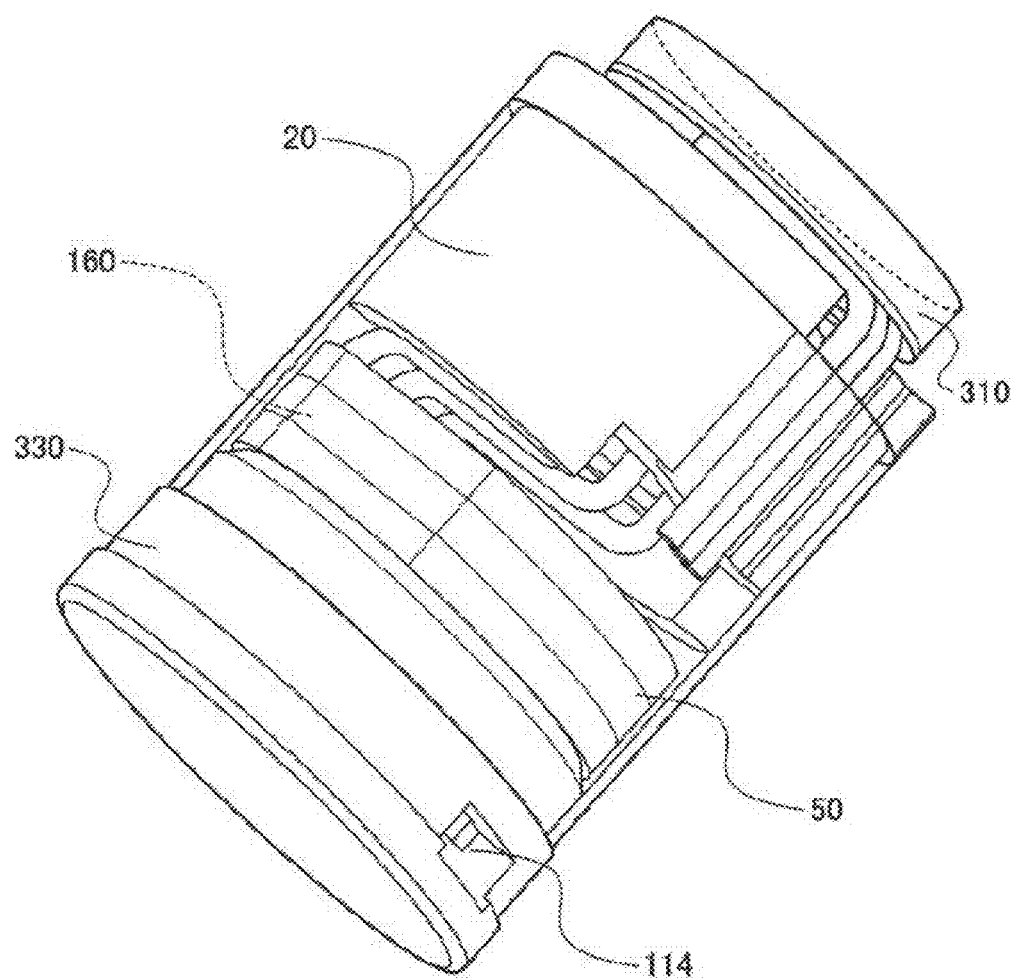
FIG. 3 is an enlarged perspective view of a part of a power source unit.
Figure 4:
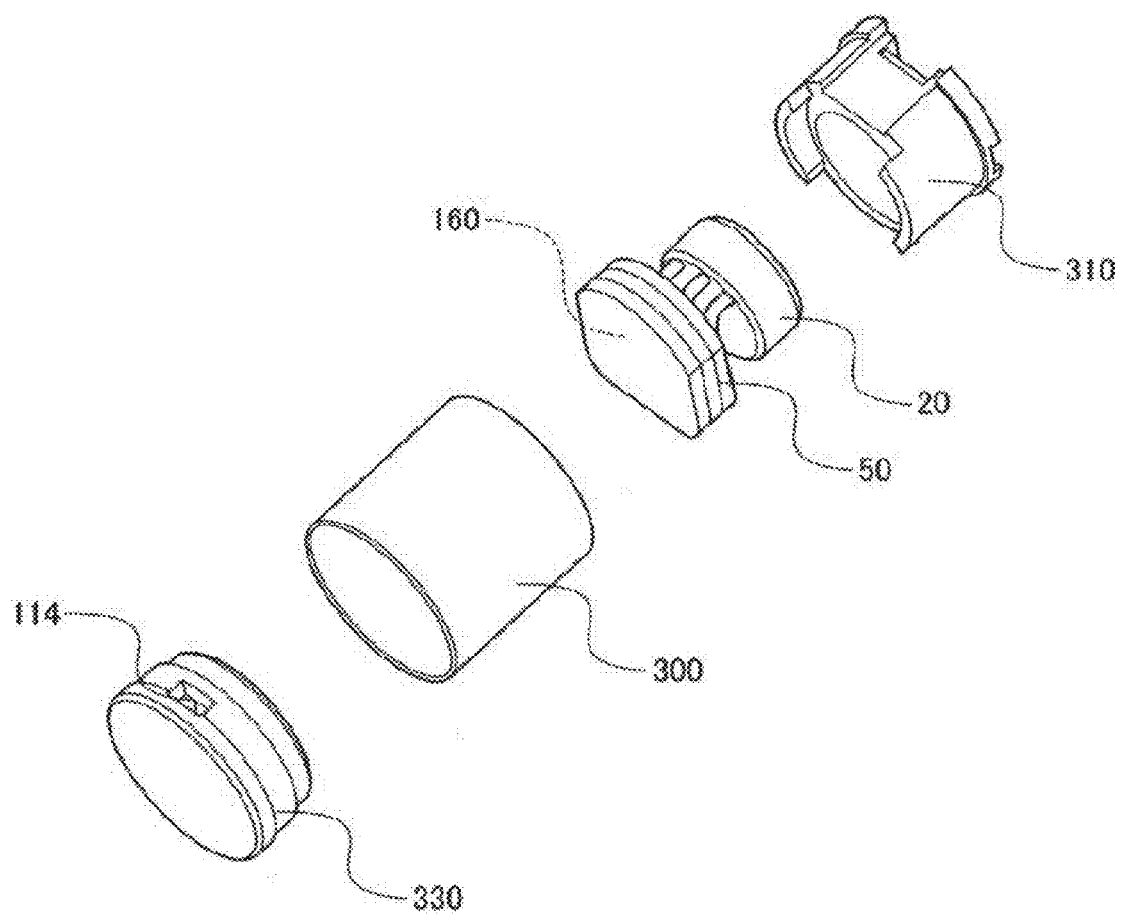
FIG. 4 is an exploded perspective view in which the part of the power source unit is disassembled.
Figure 5:
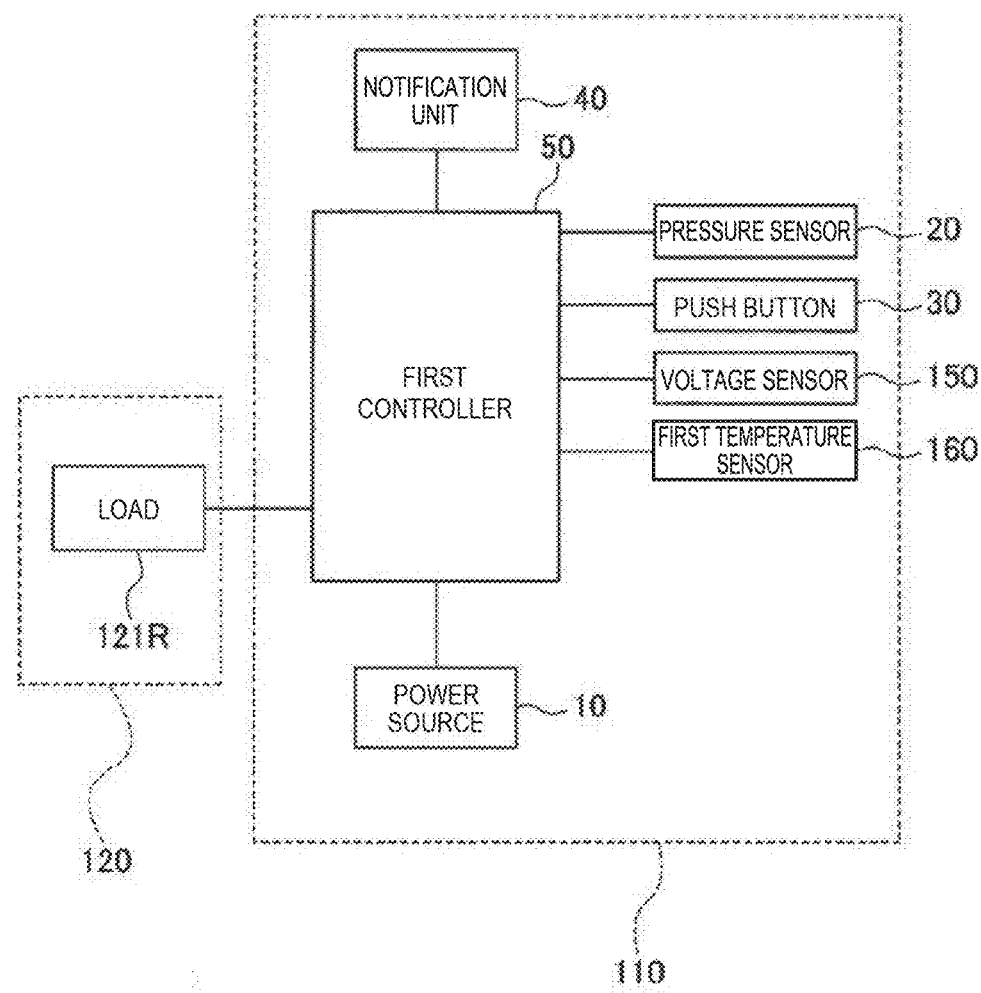
FIG. 5 is a block diagram of the flavor generation device.
Figure 6:
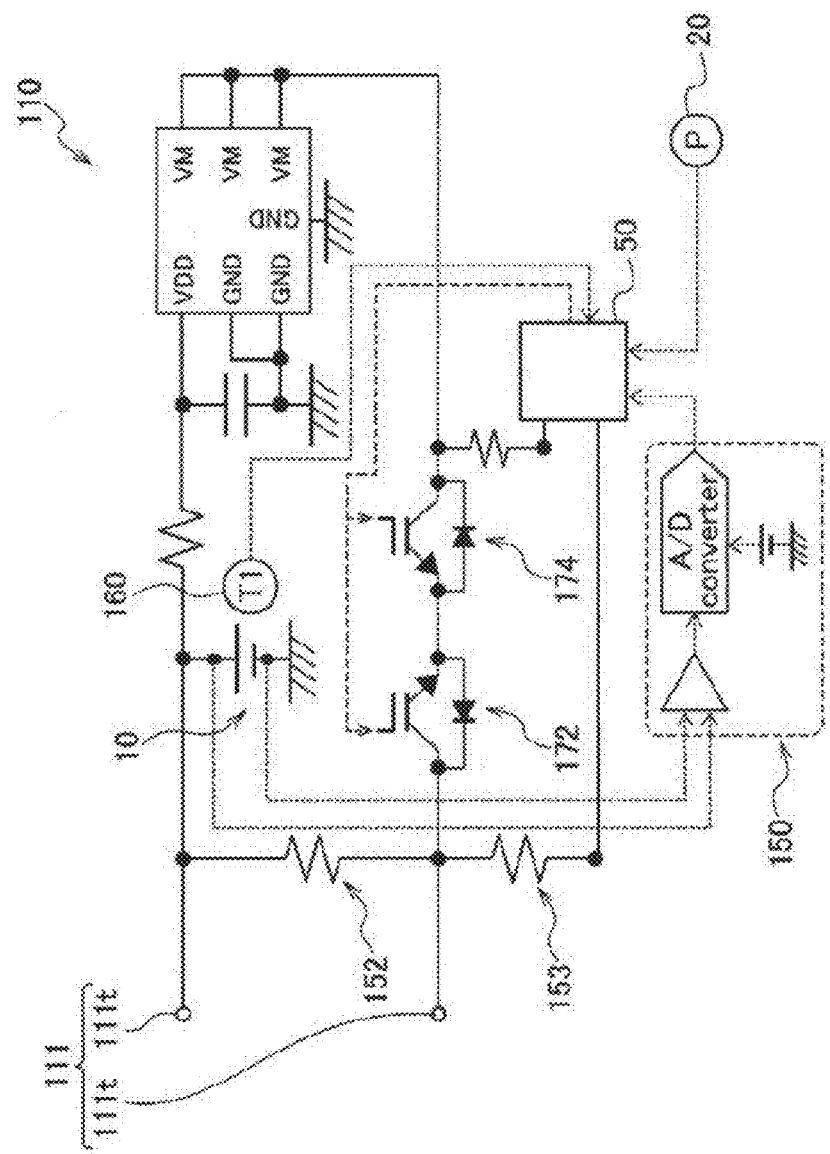
FIG. 6 is a diagram illustrating an electric circuit of the power source unit.
Figure 7:
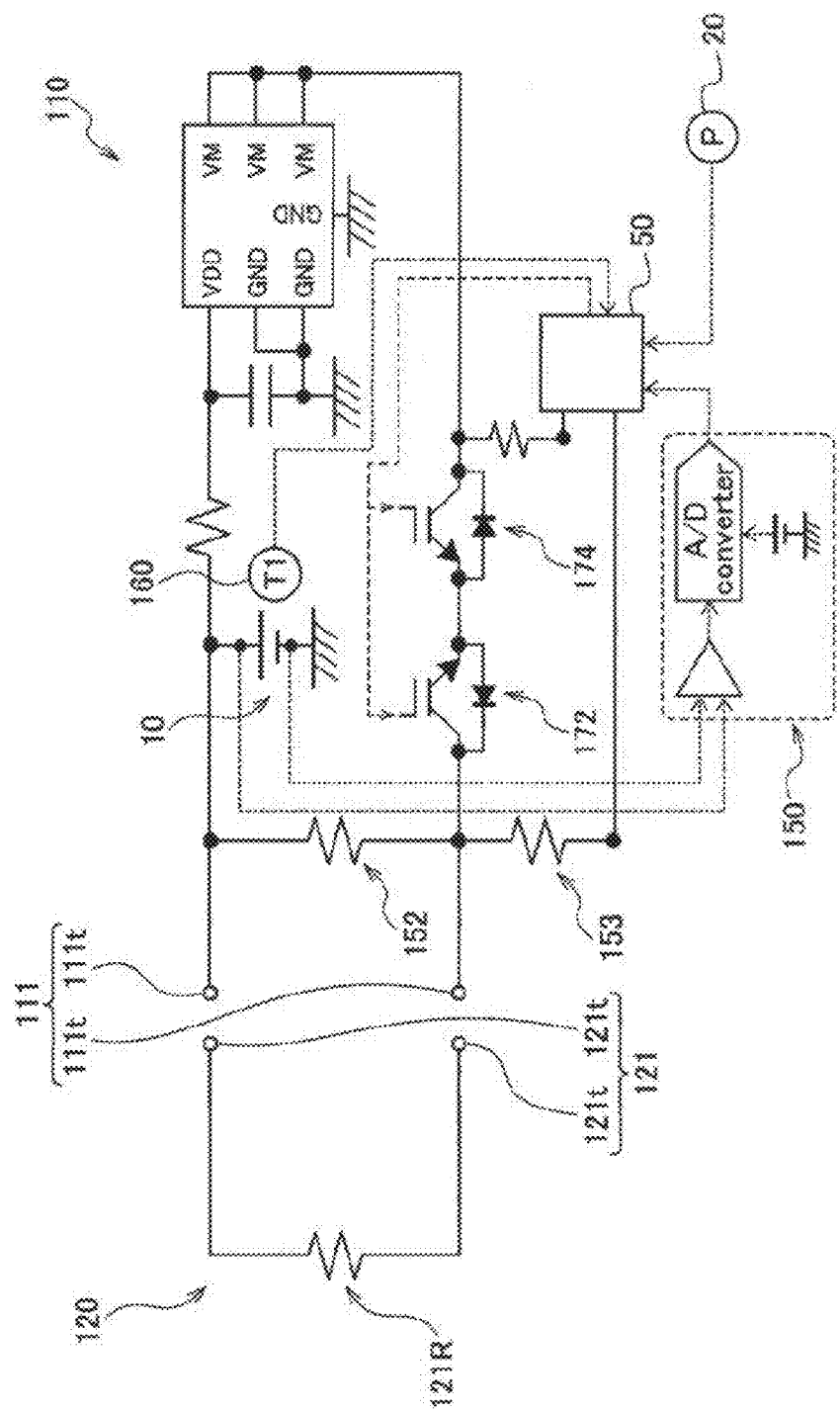
FIG. 7 is a diagram illustrating an electric circuit of the atomization unit and the power source unit in a state where a load is connected.

Hereinafter, a flavor generation device according to one embodiment will be described. FIG. 1 is an exploded view illustrating a flavor generation device according to one embodiment. FIG. 2 is a diagram illustrating an atomization unit according to one embodiment. FIG. 3 is an enlarged perspective view of a part of a power source unit. FIG. 4 is an exploded perspective view in which the part of the power source unit is disassembled. FIG. 5 is a block diagram of the flavor generation device. FIG. 6 is a diagram illustrating an electric circuit of the power source unit. FIG. 7 is a diagram illustrating an electric circuit of the atomization unit and the power source unit in a state where a load is connected to the power source.

A flavor generation device 100 may be a non-combustion-type flavor inhaler for sucking a flavor without combustion. The flavor generation device 100 may have a shape extending along a predetermined direction A that is a direction toward a suction port end E1 from a non-suction port end E2. In this case, the flavor generation device 100 may include one end E1 having a suction port 141 through which a user sucks a flavor and the other end E2 on a side opposite to the suction port 141.

The flavor generation device 100 may include a power source unit 110 and an atomization unit 120. The atomization unit 120 may include a case 123, and a load 121R disposed inside the case 123. The case 123 may form a part of the outermost outer surface of the flavor generation device.

The atomization unit 120 may be configured to be attachable to and detachable from the power source unit 110 via mechanical connection portions 111, 121. When the atomization unit 120 and the power source unit 110 are mechanically connected to each other, a load 121R in the atomization unit 120 is electrically connected to a power source 10 provided in the power source unit 110 via electric connection terminals (first connection portions) 111t and 121t. That is, the electric connection terminals 111t and 121t form a connection portion through which the load 121R and the power source 10 can be electrically connected to each other.

The atomization unit 120 includes an aerosol source to be sucked by a user, and the electric load 121R that atomizes the aerosol source upon receipt of electric power from the power source 10.

The load 121R may be an element that can generate aerosol from the aerosol source using electric power from the power source. For example, the load 121R may be a heating element such as a heater or an element such as an ultrasonic generator. Examples of the heating element may include a heating resistor, a ceramic heater, and an induction-heating-type heater.

Hereinafter, a more detailed example of the atomization unit 120 will be described with reference to FIGS. 1 and 2. The atomization unit 120 may include a reservoir 121P, a wick 121Q, and a load 121R. The reservoir 121P may be configured to reserve a liquid aerosol source. The reservoir 121P may be a porous body made of a material such as a resin web, for example. The wick 121Q may be a liquid retaining member that draws the aerosol source from the reservoir 121P using a capillary phenomenon. The wick 121Q can be made of, for example, glass fiber or porous ceramic.

The load 121R heats the aerosol source retained in the wick 121Q. The load 121R is formed by, for example, a resistance heating element (for example, a heating wire) wound around the wick 121Q.

Air flowing from an inlet 125, which takes in outside air into a flow path, passes near the load 121R in the atomization unit 120 through a flow path 122A. The aerosol generated by the load 121R flows toward the suction port 141 together with the air. Hereinafter, the flow path 122A refers to a path between the inlet 125 and the suction port 141, among paths through which a fluid can flow. That is, the flow path 122A passes an air flow generated by user's suction. In the present embodiment, the flow path 122A reaches the suction port 141 through the atomization unit 120 from the connection portion between the atomization unit 120 and the power source unit 110.

In the present embodiment described above, the inlet 125 is provided at the connection portion 121 of the atomization unit 120. Unlike the present embodiment, the inlet 125 may be provided at the connection portion 111 of the power source unit 110. Unlike the present embodiment, the inlet 125 may be also provided at the connection portion 121 of the atomization unit 120 and the connection portion 111 of the power source unit 110. In any case, the inlet 125 is provided at the connection portion between the atomization unit 120 and the power source unit 110.

The aerosol source may be a liquid at normal temperature. Examples of the aerosol source to be used can include polyhydric alcohols. The aerosol source may contain a tobacco raw material or an extract derived from the tobacco raw material, which releases a smoking flavor component when it is heated.

The liquid aerosol source at normal temperature is described in detail as an example in the embodiment described above, but alternatively a solid aerosol source at normal temperature can be used. In this case, the load 121R may be in contact with or close to the solid aerosol source to generate the aerosol from the solid aerosol source.

The atomization unit 120 may include a flavor unit (cartridge) 130 configured to be replaceable. The flavor unit 130 may include a cylindrical body 131 that accommodates the flavor source. The cylindrical body 131 may include a membrane member 133 and a filter 132 through which air or aerosol can pass. The flavor source may be provided in a space formed by the membrane member 133 and the filter 132.

According to an example of a preferred embodiment, the flavor source in the flavor unit 130 adds the smoking flavor component to the aerosol generated by the load 121R of the atomization unit 120. The flavor added to the aerosol by the flavor source is carried to the suction port 141 of the flavor generation device 100.

The flavor source in the flavor unit 130 may be solid at normal temperature. As an example, the flavor source includes a raw material piece of a plant material that adds the smoking flavor component to the aerosol. As the raw material piece included in the flavor source, a compact obtained by forming the tobacco material such as shredded tobacco or a tobacco raw material into a granular shape may be used. Alternatively, the flavor source may be a compact obtained by forming the tobacco material into a sheet shape. In addition, the raw material piece included in the flavor source may be formed by plants (for example, mint and herb) other than tobacco. The flavor source may be added with a flavoring agent such as menthol.

The flavor generation device 100 may include a mouthpiece having the suction port through which a user sucks a suction component. The mouthpiece may be configured to be attachable to and detachable from the atomization unit 120 or the flavor unit 130, or may be configured integrally with them.

Hereinafter, a more detailed example of the power source unit 110 will be described with reference to FIGS. 1, 3, and 4. The power source unit 110 may include a case 113, the power source 10, a pressure sensor 20, a first controller 50, and a temperature sensor 160. The power source 10, the pressure sensor 20, the first controller 50, and the temperature sensor 160 may be provided in the case 113. The case 113 may form a part of the outermost outer surface of the flavor generation device.

As described above, the power source 10 is configured to be electrically connected to or connectable to the load 121R that atomizes the aerosol source. The power source 10 may be replaceable with respect to the power source unit 110. The power source 10 may be, for example, a rechargeable battery such as a lithium-ion secondary battery.

The secondary battery may include a positive electrode, a negative electrode, a separator that separates the positive electrode and the negative electrode, and an electrolytic solution or an ionic liquid. The electrolytic solution or the ionic liquid may be, for example, a solution containing an electrolyte. In the lithium-ion secondary battery, the positive electrode is formed of, for example, a positive electrode material such as a lithium oxide, and the negative electrode is formed of, for example, a negative electrode material such as graphite. The electrolytic solution may be, for example, a lithium salt organic solvent.

The pressure sensor 20 is configured to output a value of a pressure change in the flavor generation device 100 generated by user's suction or blowing through the suction port 141. Specifically, the pressure sensor 20 may be a sensor that outputs an output value (for example, a voltage value or a current value) according to air pressure that changes depending on a flow rate (that is, a user's puff operation) of air to be sucked toward the suction port side from the non-suction port side. The output value of the pressure sensor 20 may have a pressure dimension, or may have a flow rate or a flow velocity of air to be sucked instead of the pressure dimension. Examples of such a pressure sensor may include a capacitor microphone sensor and a known flow rate sensor.

The first controller 50 performs various controls of the flavor generation device 100. For example, the first controller 50 may control the electric power to be supplied to the load 121R. The flavor generation device 100 may include a first switch 172 that can electrically connect and disconnect the load 121R and the power source 10 (see FIG. 6). The first switch 172 is opened and closed by the first controller 50. The first switch 172 may be formed by a MOSFET, for example.

When the first switch 172 is turned on, the electric power is supplied from the power source 10 to the load 121R. On the other hand, when the first switch 172 is turned off, the supply of the electric power from the power source 10 to the load 121R is stopped. The first switch 172 is turned on and off by the first controller 50.

The power source unit 110 may include a request sensor capable of outputting an operation request signal that is a signal for requesting the operation of the load 121R. The request sensor may be, for example, a push button 30 pressed by the user or the pressure sensor 20 described above. The first controller 50 acquires an operation request signal for the load 121R and generates a command for operating the load 121R. In a specific example, the first controller 50 outputs a command for operating the load 121R to the first switch 172, and the first switch 172 is turned on in response to the command. In this way, the first controller 50 may be configured to control the electric power to be supplied from the power source 10 to the load 121R. When the electric power is supplied from the power source 10 to the load 121R, the aerosol source is vaporized or atomized by the load 121R.

Furthermore, the power source unit 110 may include a voltage sensor 150 that can acquire or estimate an output voltage of the power source 10. In this case, the first controller 50 can perform a predetermined control according to the output value of the voltage sensor 150. For example, the first controller 50 can detect or estimate a remaining amount of the power source 10 or abnormality of the power source 10 based on the output value of the voltage sensor 150. When detecting a low remaining amount of the power source 10 or abnormality of the power source 10, the first controller 50 may notify the user of the detected information by controlling a notification unit 40.

The voltage sensor 150 may be configured to convert an analog voltage value of the power source 10 into a digital voltage value using a predetermined correlation and to output the digital voltage value. Specifically, the voltage sensor 150 may include an A/D converter that converts an analog input value into a digital output value.

In the present embodiment, the power source unit 110 may include a first resistor 152 and a second resistor 153 that are electrically connected in series with each other. The first resistor 152 is electrically connected to the power source 10 and is provided to connect a pair of electric terminals 111t to each other. One end of the second resistor 153 is connected to the first resistor 152, and the other end of the second resistor 153 is connected to the voltage sensor 150.

Electric resistance values of the first resistor 152 and the second resistor 153 are known. The electric resistance values of the first resistor 150 and the second resistor 152 may be preferably constant regardless of the state of the power source 10.

The notification unit 40 issues a notification for notifying the user of various types of information. The notification unit 40 may be, for example, a light emitting element such as an LED. Alternatively, the notification unit 40 may be an acoustic element that generates sound or a vibrator that generates vibration. Furthermore, the notification unit 40 may be configured by any combination of the light emitting element, the acoustic element, and the vibrator. The notification unit 40 may be provided at any location of the flavor generation device 100. In the present embodiment, the notification unit 40 may be built in the first controller 50, or may be disposed at a location different from the first controller 50. The notification unit 40 may be provided anywhere where the user can recognize the notification by the notification unit 40.

The power source unit 110 may include a sensor capable of outputting a detected value or estimated value of the state of the power source 10. The detected value or estimated value of the sensor is sent to the first controller 50. The sensor capable of outputting the detected value or estimated value of the state of the power source 10 may be a first temperature sensor 160 that outputs the detected value or estimated value of a temperature of the power source 10. The first temperature sensor 160 may be provided anywhere where the first temperature sensor 160 can output the detected value or estimated value of the temperature of the power source 10. In the illustrated embodiment, the first temperature sensor 160 is built in the first controller 50.

The sensor capable of outputting the detected value or estimated value of the state of the power source 10 may be a sensor that measures or estimates an internal resistance (a DC component of the impedance) of the power source 10 instead of the first temperature sensor 160. As the sensor that measures or estimates the internal resistance of the power source 10, the voltage sensor 150 may be used, for example.

In an aspect illustrated in FIGS. 3 and 4, the power source unit 110 includes a first member 300 and a second member 310 that cover the pressure sensor 20, the temperature sensor 160, and the first controller 50. The first member 300 and the second member 310 are formed in a cylindrical shape, for example. The second member 310 is fitted to one end of the first member 300. Aa cap 330 is provided at the other end of the first member 300. The cap 330 may be formed with an opening 114 that is opened to the atmosphere. Thus, the inside of the first member 300 and the second member 310 is opened to the atmosphere.

Figure 8:
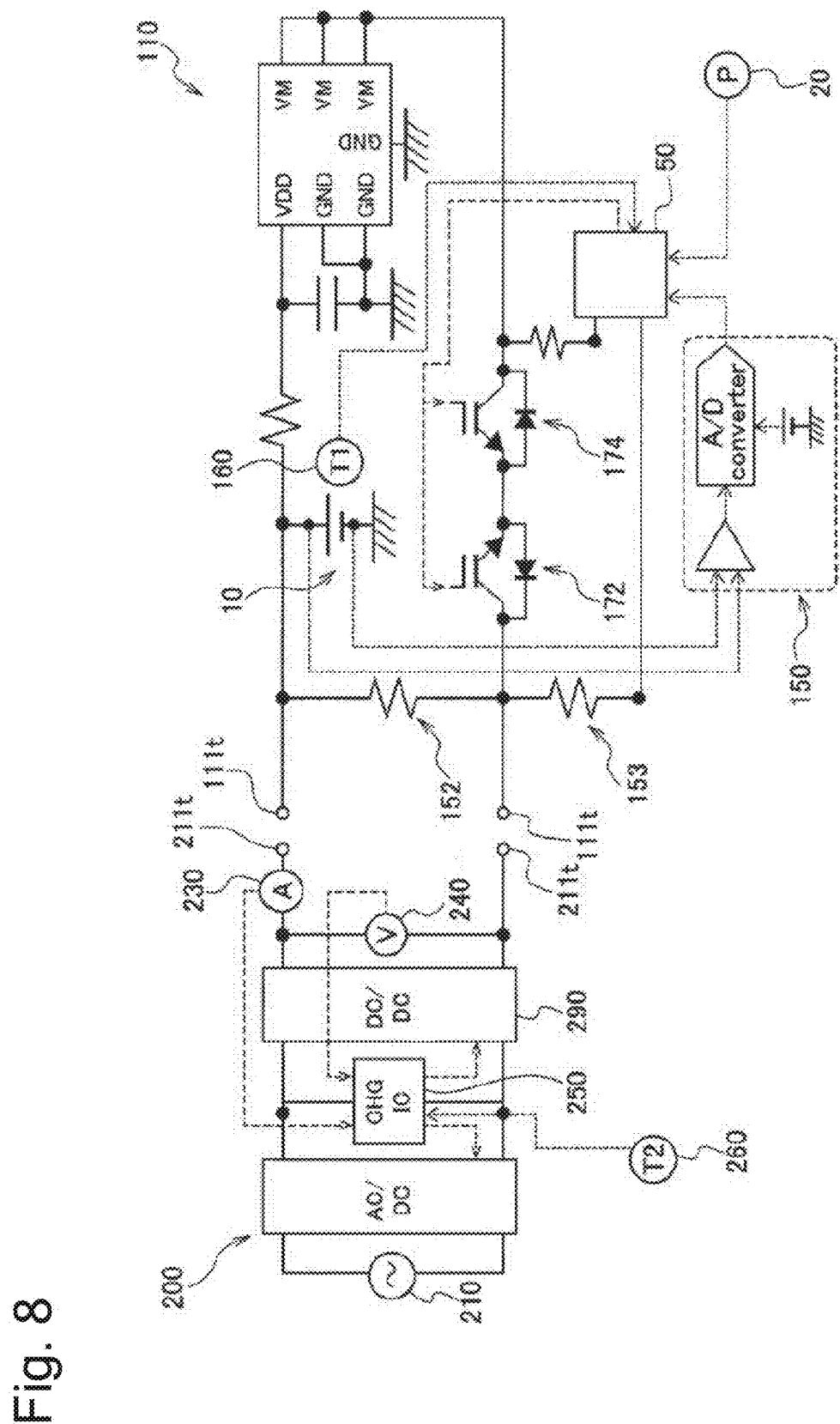
FIG. 8 is a diagram illustrating an electric circuit of a flavor generation system including the power source unit and a charging unit
Figure 9:
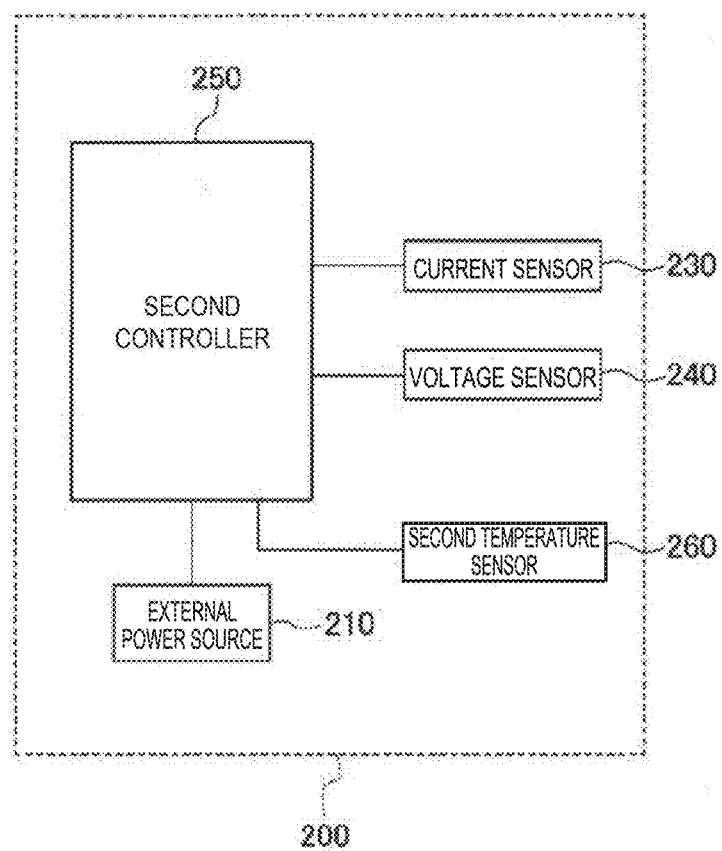
FIG. 9 is a block diagram of the charging unit.

The power source unit 110 may be configured to be connectable to a charging unit 200 that can charge the power source 10 (see FIG. 8). A combination of the power source unit 110 and the charging unit 200 forms a flavor generation system of the present invention. FIG. 8 is a diagram illustrating an electric circuit of the flavor generation system including the power source unit and the charging unit. FIG. 9 is a block diagram of the charging unit.

When the charging unit 200 is connected to the power source unit 110, the charging unit 200 is electrically connected to the power source 10 of the power source unit 110. The charging unit 200 may include a current sensor 230, a voltage sensor 240, a second controller 250, and a second temperature sensor 260.

The charging unit 200 is electrically connected to the power source unit 110 by a pair of connection terminals 211t. A pair of electric terminals of the power source unit 110 used to electrically connect the charging unit 200 may be the same as the pair of electric terminals 111t of the power source unit 110 used to electrically connect the load 121R. Alternatively, the pair of electric terminals of the power source unit 110 used to electrically connect the charging unit 200 may be provided separately from the pair of electric terminals 111t.

To simplify the structure of the flavor generation device 100, the second controller 250 of the charging unit 200 may be configured to be incapable of communicating with the first controller 50 of the power source unit 110. That is, a communication terminal for communicating between the second controller 250 of the charging unit 200 and the first controller 50 of the power source unit 110, and a communication system including a receiver and a transmitter are unnecessary. In other words, in a connection interface with the charging unit 200, the power source unit 110 has only two electric terminals, one for a main positive bus and the other for a main negative bus. In this case, the power source unit 110 and the charging unit 200 are electrically connected to each other only by the main positive bus and the main negative bus.

When an external power source 210 is an AC power source, the charging unit 200 may include an inverter (AC/DC converter) that converts AC into DC. The current sensor 230 is a sensor that acquires a value of a charging current supplied from the charging unit 200 to the power source 10. The voltage sensor 240 is a sensor that acquires a voltage between the pair of electric terminals of the charging unit 200. In other words, the voltage sensor 240 acquires a potential difference applied between the pair of connection terminals 111t of the power source unit.

The second controller 250 is configured to control a charge of the power source 10. The second controller 250 may control the charge of the power source 10 using output values from the temperature sensor 260, the current sensor 230 and/or the voltage sensor 240. Note that the charging unit 200 may further include a voltage sensor that acquires DC voltage output from the inverter and a converter that can increase and/or decrease a DC voltage output from the inverter or the external power source 210.

The power source unit 110 may include a second switch 174 between the power source 10 and the electric connection terminals (first connection portions) 111t and 121t. The second switch 174 is opened and closed by the first controller 50. The second switch 174 may be formed by a MOSFET, for example. The second switch 174 is turned on and off by the first controller 50.

When the second switch 174 is turned on, the charging current can flow to the power source 10 from the charging unit 200. When the second switch 174 is turned off, the charging current can hardly flow to the power source 10 from the charging unit 200. That is, even when the charging unit 200 is connected to the power source 110, the first controller 50 can temporarily or permanently stop the charge of the power source 10 with the second switch 174.

The charging unit 200 may include a conversion unit 290 that can convert a voltage or a current of the input electric power and output the converted voltage or current. The second controller 250 is configured to be capable of adjusting the value of the voltage or current to be output from the conversion unit 290 by operating the conversion unit 290. Thus, the second controller 250 can adjust the charging current for charging the power source 10.

The first controller 50 of the power source unit 110 may be configured to be capable of determining whether the charging unit 200 is connected. The first controller 50 can determine, based on the change in a voltage drop amount in the second resistor 153 described above, whether the charging unit 200 is connected.

The voltage drop amount in the second resistor 153 differs depending on a case where nothing is connected to the pair of electric terminals 111t and a case where the external unit such as the charging unit 200 or the atomization unit 120 is connected to the pair of electric terminals 111t. Accordingly, the first controller 50 can detect the connection of the external unit such as the charging unit 200 or the atomization unit 120 by acquiring the voltage drop amount in the second resistor 153.

For example, when detecting a high-level voltage value $V_{wake}$ at the second resistor 153, the first controller 50 can estimate that the charging unit 200 is not connected to the connection terminals 111t. In addition, when detecting a low-level voltage value $V_{wake}$, the first controller 50 can estimate that the charging unit 200 is connected to the connection terminals 111t.

More specifically, in a state where the charging unit 200 is not connected to the connection terminals 111t, a current flows from the power source 10 to the first controller 50 via the first resistor 152 and the second resistor 153. Accordingly, since the voltage drop occurs in the second resistor 153 due to the current flowing through the second resistor 153, the first controller 50 detects a high-level voltage value $V_{wake}$ at the second resistor 153. On the other hand, among the pair of electric terminals 111t, when the main negative bus of the charging unit 200 connected between the first resistor 152 and the second resistor 153 falls to the ground potential due to grounding, a portion between the first resistor 152 and the second resistor 153 falls to the ground potential due to connection of the charging unit 200 to the connection terminals 111t. Therefore, since the current does not flow through the second resistor 153 in a state where the charging unit 200 is connected to the connection terminals 111t, the first controller 50 detects a low-level voltage value $V_{wake}$.

Instead of the aspect described above, the first controller 50 may detect the connection of the charging unit 200, for example, based on a change in potential difference between the pair of connection terminals 111t.

Charge Control of Power Source

In the present embodiment, both of the first controller 50 of the power source unit 110 and the second controller 250 of the charging unit 200 are configured to be capable of controlling the charge of the power source 10, in particular, the charging speed of the power source 10. That is, the first controller 50 can control the charging speed by operating the second switch 174. The charging speed can be expressed using a charge rate (a so-called C-rate) or a value of electric power per unit time for charging the power source 10. Here, the control of the charging speed includes setting the charging speed to "0." That is, the control of the charging speed includes stopping the charge.

For example, the first controller 50 can control the charging speed by repeating opening and closing of the second switch 174 at the desired time interval. The first controller 50 can stop the charge by maintaining the second switch 174 in an open state. In any case, it will be apparent that the charging speed is slower than that in a case where the second switch 174 is maintained in a closed state.

The first controller 50 preferably controls the charging speed based on the output value of the sensor capable of outputting the detected value or estimated value of the state of the power source 10. Such a sensor may be, for example, the first temperature sensor 160 described above. In this case, the first controller 50 can control, based on the temperature of the power source 10, whether to set the charging speed to "0," by operating the second switch 174.

Figure 10:
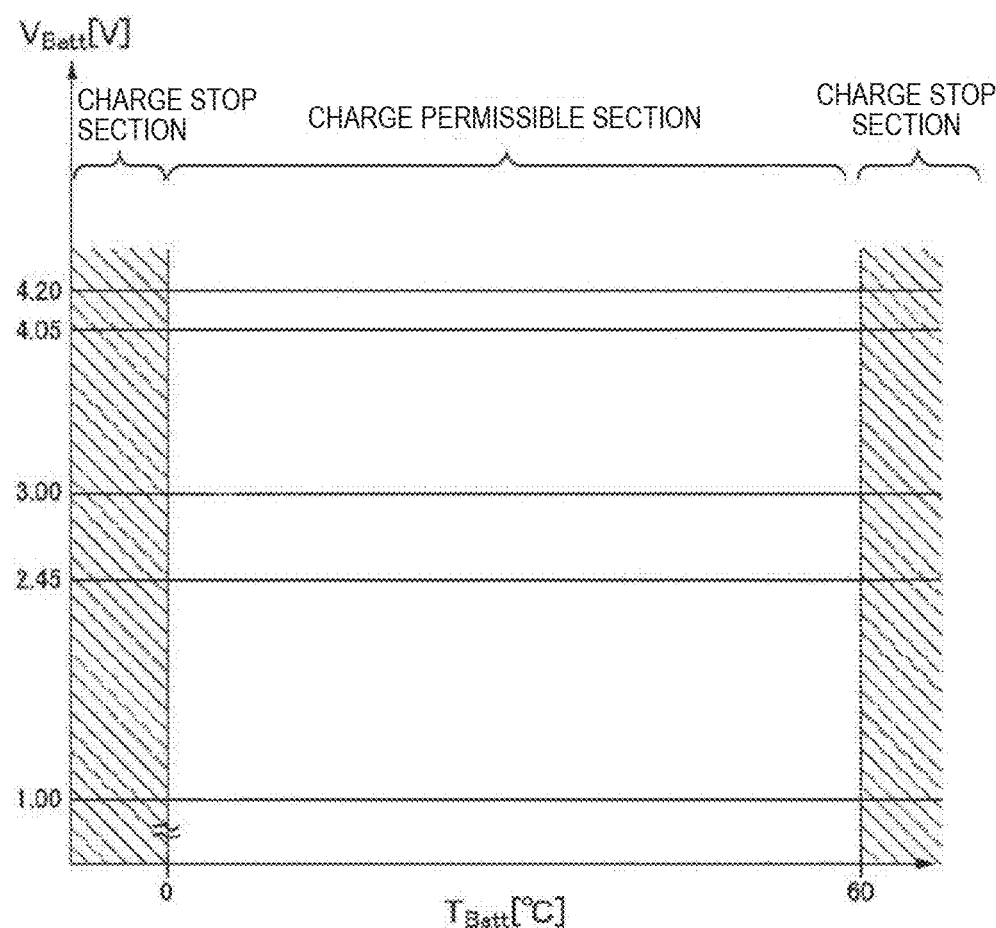
FIG. 10 is a map illustrating an example of a correlation (first correlation) between a temperature and a charging speed of a power source.

FIG. 10 is a map illustrating an example of a correlation between a temperature and a charging speed of the power source. As illustrated in FIG. 10, in a case where the output value of the first temperature sensor 160 is within a predetermined temperature range (belongs to a charge permissible section of FIG. 10), the first controller 50 may close the second switch 174. When the second switch 174 is closed, the charge of the power source 10 is permitted, whereby the charging speed becomes larger than "0." In a case where the output value of the first temperature sensor 160 is outside the predetermined temperature range (belongs to a charge stop section of FIG. 10), the first controller 50 may open the second switch 174. When the second switch 174 is opened, the charge of the power source 10 is stopped, whereby the charging speed becomes "0."

Specifically, the first controller 50 may be configured to open the second switch 174 in a case where the output value of the first temperature sensor 160 is equal to or lower than a first predetermined temperature, which causes solidification of the electrolytic solution or the ionic liquid, or in a case where the temperature of the power source 10 is estimated to be equal to or lower than the first predetermined temperature based on the output value of the first temperature sensor 160. In this way, the power source 10 can be protected even in the temperature range which causes solidification of the electrolytic solution or the ionic liquid of the power source 10.

The first predetermined temperature may be, for example, 0° C. as illustrated in FIG. 10. When the temperature of the power source 10 becomes equal to or lower than 0° C., moisture in the power source 10, e.g., moisture in the electrolytic solution may be solidified. Under such circumstances, charging the power source 10 easily causes acceleration of the deterioration of the power source 10. Accordingly, in such a temperature range, the charge of the power source 10 is preferably stopped.

In addition, the first controller 50 may be configured to open the second switch 174 in a case where the output value of the first temperature sensor 160 is equal to or lower than a second predetermined temperature at which electrodeposition occurs on the electrode in the power source 10, or in a case where the temperature of the power source 10 is estimated to be equal to or lower than the second predetermined temperature based on the output value of the first temperature sensor 160.

In particular, in a case where the power source 10 is a lithium-ion secondary battery, when a high load is applied to the power source 10 during charging at low temperature, metallic lithium may be deposited (electrodeposited) on a surface of the negative electrode. Therefore, the charge is preferably stopped. Here, since the second predetermined temperature may depend on the type of the lithium-ion secondary battery, it is necessary to specify the second predetermined temperature by an experiment in advance. The second predetermined temperature may be the same as or different from the first predetermined temperature.

Furthermore, the first controller 50 may be configured to open the second switch 174 in a case where the output value of the first temperature sensor 160 is equal to or higher than a third predetermined temperature at which a change in structure or composition of the electrode occurs in the power source 10, or in a case where the temperature of the power source 10 is estimated to be equal to or higher than the third predetermined temperature based on the output value of the first temperature sensor 160.

When the temperature of the power source 10 becomes extremely high, a change in structure or composition of the electrode may occur. Therefore, the first controller 50 preferably stops the charge. An example of the change in structure or composition of the electrode is aggregation of an active material, conductive additive, and binder or detachment of an active material, conductive additive, and binder from the electrode. The third predetermined temperature may be, for example, 60° C.

The information about the correlation (first correlation) between the temperature and the charging speed of the power source as illustrated in FIG. 10 may be stored in a memory in the first controller 50.

Instead of the above-described aspect, the first controller 50 may control the charging speed based on the output value of the sensor that measures or estimates the internal resistance of the power source 10. That is, the sensor capable of outputting the detected value or estimated value of the state of the power source 10 may be a sensor that measures or estimates the internal resistance of the power source 10, e.g., the voltage sensor 150. When the internal resistance of the power source 10 increases, heat generation of the power source 10 increases during charging and discharging. Even in that case, the power source 10 can be protected by controlling the charging speed based on the internal resistance of the power source 10 as described above, for example, by reducing the charging speed when the internal resistance of the power source 10 increases.

In addition, the second controller 250 can control the charging speed by operating the conversion unit 290. It will be apparent to those skilled in the art that the charging speed can be controlled in a case where the conversion unit 290 performs a current control mode that controls CV charging (described later) and an output current, as an example. That is, the second controller 250 can adjust the value of the voltage or current to be output from the conversion unit 290. Here, the control of the charging speed includes setting the charging speed to "0." That is, the control of the charging speed also includes stopping the charge.

The conversion unit 290 may be configured to be capable of performing a first charging mode and a second charging mode which are different in the charging speed. The second charging mode may be a mode in which a value of the electric power or current per unit time that can be output by the conversion unit 290 is greater than that in the first charging mode. In this case, the second charging mode is also referred to as a "quick charging mode." Note that, to distinguish from the second charging mode, the first charging mode is also referred to as a "normal charging mode."

In addition, the second controller 250 may be configured to be capable of performing a third mode in which a value of the electric power or current per unit time that can be output by the conversion unit 290 is smaller than that in the first charging mode. In an example illustrated in FIG. 11, the third mode is performed in a state where a remaining amount of the power source 10 is decreased significantly, i.e., in an over-discharge state or a deep discharged state. The over-discharge state or the deep discharged state may be a state in which the voltage value of the power source 10 is lower than a discharge termination voltage. In the over-discharge state or the deep discharged state, the power source 10 is easily damaged. Therefore, the second controller 250 needs to charge the power source 10 at a low speed and attempt to recover the power source 10 (return to the state where the voltage value is equal to or higher than the discharge termination voltage).

The second controller 250 preferably controls the charging speed based on the output value of the second temperature sensor 260. That is, the second controller 250 controls the charging speed as described above, i.e., selects the mode based on the temperature of the charging unit 200.

Figure 11:
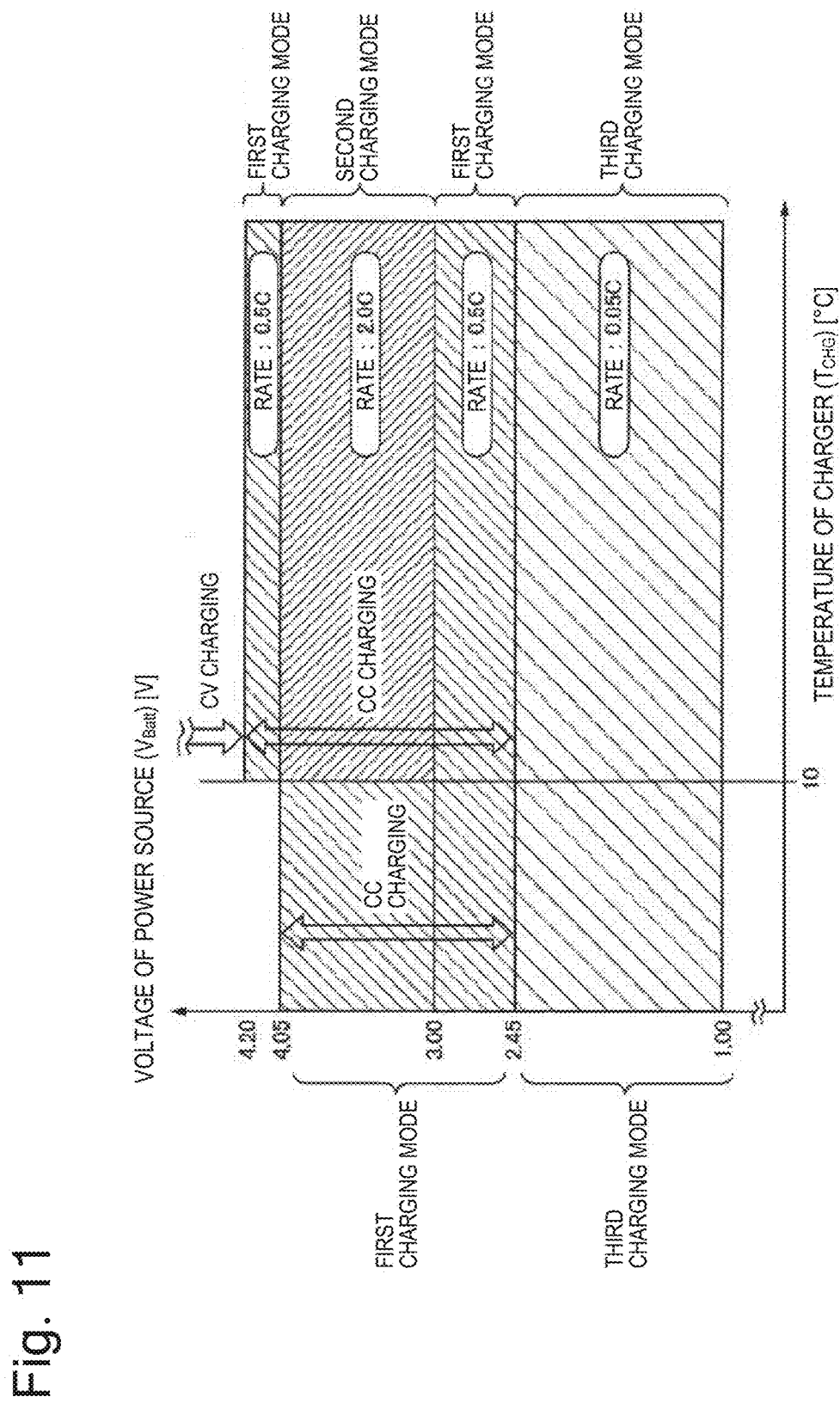
FIG. 11 is a map illustrating an example of a correlation (second correlation) between a temperature and a charging speed of the charging unit.

FIG. 11 is a map illustrating an example of a correlation between a temperature and a charging speed of the charging unit 200. As illustrated in FIG. 11, the second controller 250 causes the conversion unit 290 to perform the second charging mode in a case where the output value of the second temperature sensor 260 is equal to or higher than a first threshold. On the other hand, the second controller 250 causes the conversion unit 290 to perform the first charging mode in a case where the output value of the second temperature sensor 260 is lower than the above-described first threshold.

Figure 12:
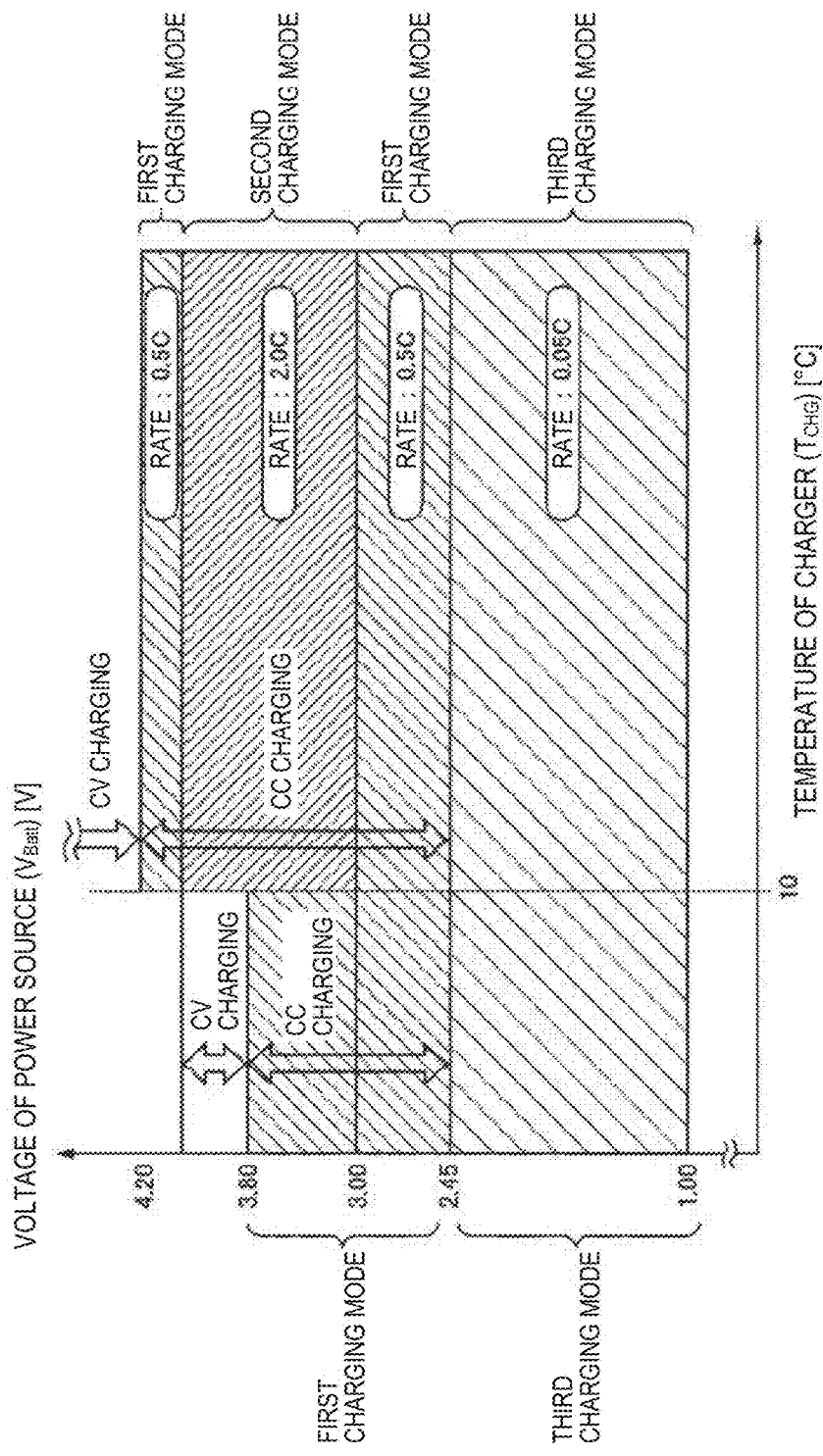
FIG. 12 is a map illustrating another example of the correlation (second correlation) between a temperature and a charging speed of the charging unit.

In FIGS. 11 and 12, the charging speed is expressed using a C-rate. In general, the charging speed at which the power source 10 is charged to a fully charged state from the discharge termination state for one hour can be represented by 1.0 C as a reference. In a case of a charge rate higher than 1.0 C, the charge is performed faster than 1.0 C. In a case of charge rate lower than 1.0 C, the charge is performed slower than 1.0 C. As an example, when the charge is performed at a charge rate of 2.0 C, the charge is performed at twice the charge rate of 1.0 C. When the charge is performed at a charge rate of 0.5 C, the charge is performed at half the charge rate of 1.0 C. In the present embodiment, as an example, the charging speed of 0.5 C is used in the first charging mode, the charging speed of 2.0 C is used in the second charging mode, and the charging speed of 0.05 C is used in the third charging mode.

The first threshold may be, for example, 10° C. Therefore, the second controller 250 does not perform the quick charging mode at low temperature to reduce the load applied to the power source 10, which can prevent a phenomenon such as electrodeposition.

More specifically, the second controller 250 may select one of the first charging mode and the second charging mode based on the other conditions, in a case where the output value of the second temperature sensor 260 is equal to or higher than the above-described first threshold. In the present embodiment, the second controller 250 is configured to be capable of adjusting a value of the voltage or current to be output from the conversion unit 290 by operating the conversion unit 290, based on a value related to the remaining amount of the power source 10 and the output value of the second temperature sensor 260.

The value related to the remaining amount of the power source 10 is not limited to a particular value, but may be, for example, the voltage of the power source 10. The voltage of the power source 10 can be acquired by the voltage sensor 240.

In this case, the second controller 250 may be configured to perform only constant current charging (CC charging) of the constant current charging and constant voltage charging (CV charging) in a case where the output value of the temperature sensor 260 is smaller than the first threshold. Note that the charging speed of the constant current charging may be any value between 0.5 to 1.0 C, and, as an example, may be 1.0 C. The second controller 250 may perform the constant current charging and the constant voltage charging in a case where the output value of the temperature sensor 260 is equal to or higher than the first threshold. More specifically, in a case where the output value of the temperature sensor 260 is equal to or higher than the first threshold and in a case where the voltage of the power source 10 acquired by the voltage sensor 240 is equal to or higher than a switching voltage, the second controller 250 may perform the constant voltage charging. In a case where the output value of the temperature sensor 260 is equal to or higher than the first threshold and in a case where the voltage of the power source 10 acquired by the voltage sensor 240 is lower than a switching voltage, the second controller 250 may perform the constant current charging. Here, the switching voltage may be, for example, 4.2 V.

In this way, in the correlation (second correlation) illustrated in FIG. 11, at low temperature, a full charge capacity of the power source 10 is decreased, and therefore the second controller 250 performs only the constant current charging without performing the constant voltage charging. In addition, at low temperature, the internal resistance of the power source 10 increases, and the voltage of the power source 10 acquired by the voltage sensor 240 is higher than a true value. Therefore, overcharge of the power source 10 can be prevented by omitting the CV charging.

Instead of the correlation illustrated in FIG. 11, the second controller 250 may control the charging speed based on a correlation illustrated in FIG. 12. In the correlation illustrated in FIG. 12, both of the constant current charging (CC charging) and the constant voltage charging (CV charging) are performed even when the output value of the temperature sensor 260 is lower than the first threshold. Note that the switching voltage in a case where the output value of the temperature sensor 260 is lower than the first threshold is smaller than the switching voltage in a case where the output value of the temperature sensor 260 is equal to or higher than the first threshold. That is, the second controller 250 may be configured so that the switching value which is a value related to the remaining amount of the power source when the constant current charging is switched to the constant voltage charging in a case where the output value of the temperature sensor 260 is lower than the first threshold, e.g., a switching value (switching voltage) of the voltage value of the power source 10 is smaller than the switching value in a case where the output value of the temperature sensor 260 is equal to or higher than the first threshold. In this way, the constant voltage charging can be performed before charge completion, even at low temperature at which the full charge capacity of the power source 10 is decreased. Furthermore, the power source 10 can be charged to near full charge while avoiding overcharge.

The information about the correlation (second correlation) between the temperature and the charging speed of the charging unit 200 as illustrated in FIG. 11 or 12 may be stored in a memory in the second controller 250.

As described above, in the control of the charging speed, an object to be operated by the first controller 50 is different from an object to be operated by the second controller 250. In this way, the first controller 50 and the second controller 250 share the control of the charging speed by operating the respective objects different from each other.

That is, the charging speed is controlled by both of the first controller 50 and the second controller 250. More specifically, the second controller 250 may adjust (operate) a value of the voltage or current to be output from the conversion unit 290 by operating the conversion unit 290 and the first controller 50 may control (operate) whether to set the charging speed to 0" by operating the second switch 174.

Out of determinations to be made in the charge of the power source 10, the number of first options for the determination to be made by the first controller 50 is preferably smaller than the number of second options for the determination to be made by the second controller 250. For example, as illustrated in FIG. 10, the first controller 50 has two options (first options): to turn on or to turn off the second switch 174 based on the output value of the first temperature sensor 160. On the other hand, as illustrated in FIGS. 11 and 12, the second controller 250 has more than two options: to perform the first charging mode, the second charging mode, the third charging mode, the CV charging, or the CC charging based on the output value of the second temperature sensor 260. The first controller 50 need not to provide high performance by allowing the external unit other than the power source unit 110, i.e., the charging unit 200 to have many options, whereby a configuration of the power source unit 110 and consequently the flavor generation device 100 can be simplified. In the flavor generation device 100 that is carried routinely by the user and that is held by a mouth of the user in use, the above-described effect is particularly preferable.

Control Flow 1 by Second Controller of Charging Unit

Figure 13:
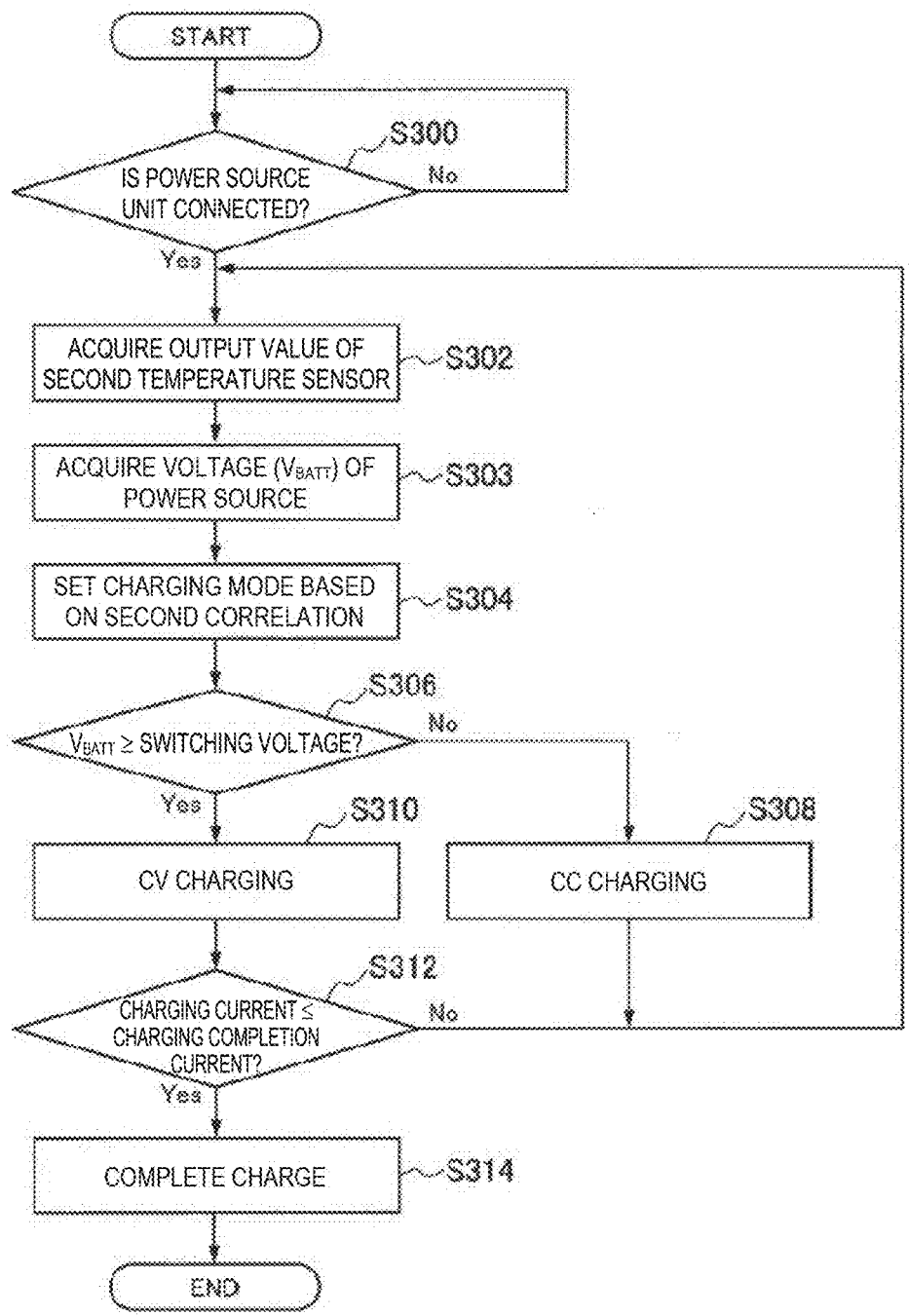
FIG. 13 is a flowchart illustrating an example of a control flow by a second controller of the charging unit.

FIG. 13 is a flowchart illustrating an example of a control flow by the second controller 250 of the charging unit 200. Firstly, the second controller 250 determines whether the charging unit 200 is connected to the power source unit 110 (step S300). The second controller 250 waits until the charging unit 200 is connected to the power source unit 110.

The connection between the charging unit 200 and the power source unit 110 can be detected by a known method. For example, when a change in voltage between the pair of electric terminals 211t of the charging unit 200 is detected by the voltage sensor 240, the second controller 250 can determine whether the charging unit 200 is connected to the power source unit 110. Instead of the voltage sensor 240, a mechanical switch may be used in which the output is switched between the connected state and the disconnected state between the charging unit 200 and the power source unit 110.

When the charging unit 200 is connected to the power source unit 110, the second controller 250 acquires an output value of the second temperature sensor 260 and a voltage ($V_{BATT}$) of the power source 10 (steps S302 and S303). Either of the output value of the second temperature sensor 260 or the voltage ($V_{BATT}$) of the power source 10 may be acquired first, or they may be acquired at the same time. The second controller 250 can acquire the voltage ($V_{BATT}$) of the power source 10 from the voltage sensor 240. Note that when the voltage of the power source 10 is acquired by the voltage sensor 240, the first controller 50 of the power source unit 110 maintains the second switch 174 in the closed state ("on" state).

Next, the second controller 250 sets the charging mode based on the output value of the second temperature sensor 160 (step S304). Specifically, the second controller 250 sets the charging speed (charging mode) of the power source 10 based on the correlation (second correlation) for setting the charging conditions of the power source 10 as illustrated in FIG. 11 or 12. Preferably, the second controller 250 sets the charging speed (charging mode) based on both of the output value of the second temperature sensor 160 and the value related to the remaining amount of the power source 10, e.g., the voltage ($V_{BATT}$) of the power source 10.

Subsequently, the second controller 250 determines, as necessary, which one of the constant voltage charging and the constant current charging is to be performed (step S306). Specifically, when the voltage ($V_{BATT}$) of the power source 10 is lower than the above-described switching voltage, the second controller 250 supplies the current to the power source unit 110 by the constant current charging (step S308).

As the charge of the power source 10 proceeds, the voltage of the power source 10 increases. Accordingly, after performing the constant current charging for a certain period, the second controller 250 acquires an output value of the second temperature sensor 260 and a voltage ($V_{BATT}$) of the power source 10 again (steps S302 and S303). Then, the second controller 250 sets the charging speed (charging mode) again based on both of the output value of the second temperature sensor 160 and the voltage ($V_{BATT}$) of the power source 10. Note that the charging speed can be set by adjusting a value of the voltage or current to be output from the conversion unit 290 by operating the conversion unit 290. Thereafter, as described above, the second controller 250 determines, as necessary, which one of the constant voltage charging and the constant current charging is to be performed (step S306).

When the voltage ($V_{BATT}$) of the power source 10 is equal to or higher than the above-described switching voltage, the second controller 250 supplies the current to the power source unit 110 by the constant voltage charging (step S310). In the constant voltage charging, as the charge of the power source 10 proceeds, a difference between the charging voltage and the voltage of the power source 10 is reduced, whereby the charging current decreases.

When the charging current is larger than the charging completion current (step S312), the second controller 250 acquires an output value of the second temperature sensor 260 and a voltage ($V_{BATT}$) of the power source 10 again (steps S302 and S303). Then, the second controller 250 sets the charging speed (charging mode) again based on both of the output value of the second temperature sensor 160 and the voltage ($V_{BATT}$) of the power source 10.

When the charging current is equal to or smaller than the charging completion current during the constant voltage charging (step S312), the second controller 250 determines that the charge has been completed, and stops the charge of the power source 10 (step S314).

As described above, the second controller 250 preferably acquires not only the output value of the temperature sensor 260 but also the voltage ($V_{BATT}$) of the power source 10, and sets the charging mode also based on the voltage of the power source 10. The second controller 250 can use the value related to the remaining amount of the power source instead of the voltage of the power source 10. That is, in step S304, the second controller 250 may adjust a value of the voltage or current to be output from the conversion unit 290 by operating the conversion unit 290, based on the value related to the remaining amount of the power source 10 and the output value of the second temperature sensor 260.

In the control flow described above, the second controller 250 periodically acquires the output value of the second temperature sensor 260, and selects the charging mode based on the acquired output value. Alternatively, the second controller 250 may select the charging mode using the output value of the second temperature sensor 260 acquired once after the power source unit 110 is connected. That is, the second controller 250 may acquire the output value of the second temperature sensor 260 only once in the determination of the charging speed. In this case, the second controller 250 determines the charging mode based on the correlation illustrated in FIG. 11 or 12 according to a change in voltage of the power source 10, assuming that the temperature of the charging unit 200 is not changed. In this case, after step S308, the process returns to step S306 rather than to step S302. When it is determined as No in step S312, the process returns to S312 rather than to step S302. Accordingly, the control flow can be simplified.

In the control flow illustrated in FIG. 13, the second controller 250 sets the charging mode in step S304 before determining, in step S306, which one of the constant voltage charging and the constant current charging is to be performed. Since the second correlation used in step S304 specifies the charging speed in the constant current charging, the charging mode may be instead determined in step S304 after it is determined, in step S306, that the constant current charging is to be performed.

Control by First Controller in Charging Mode

Figure 14:
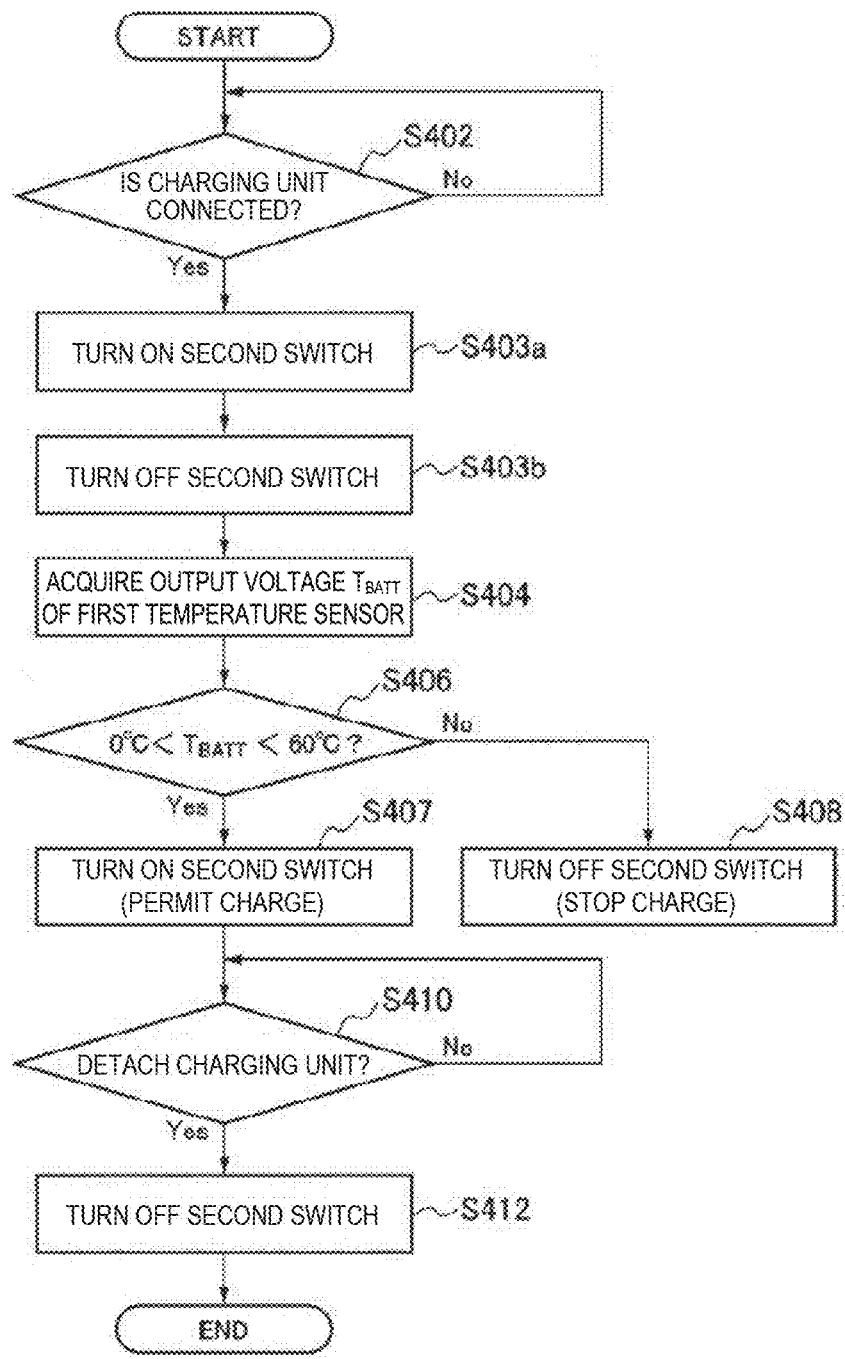
FIG. 14 is a flowchart illustrating an example of a control flow by a first controller of the power source unit.

FIG. 14 is a flowchart illustrating an example of a control flow by the first controller of the power source unit.

Firstly, the first controller 50 determines whether the charging unit 200 is connected to the power source unit 110 (step S402). The connection of the charging unit 200 to the power source unit 110 can be detected by the above-described method.

Subsequently, the first controller 50 turns on the second switch 174 (step S403a) to electrically connect the power source unit 110 and the charging unit 200, so that the second controller 250 can acquire the voltage ($V_{BATT}$) of the power source 10 in step S303 described above. Then, the first controller 50 turns off the second switch 174 to electrically disconnect the power source unit 110 from the charging unit 200 (step S403b).

When the first controller 50 detects the connection of the charging unit 200 to the power source unit 110, the first controller 50 acquires an output value of the first temperature sensor 160 provided in the power source unit (step S404).

Next, the first controller 50 sets the charging speed based on the first correlation for setting the charging conditions of the power source based on the output value of the first temperature sensor 160 (steps S406, S407, and S408). The first correlation is as described with reference to FIG. 10.

The first controller 50 preferably controls the charging speed to be set to "0" or not by operating the second switch 174. More specifically, the first controller 50 controls the charging speed to be set to "0" or not by operating the second switch 174, based on the output value of the first temperature sensor 160.

In the flow illustrated in FIG. 14, the first controller 50 opens the second switch 174 (steps S406 and S408) in a case where the temperature of the power source 10 is equal to or lower than the first predetermined temperature or in a case where the temperature of the power source 10 is estimated to be equal to or lower than the first predetermined temperature based on the output value of the first temperature sensor 160. Here, the first predetermined temperature may be, for example, 0° C.

In addition, the first controller 50 opens the second switch 174 (steps S406 and S408) in a case where the temperature of the power source 10 is equal to or higher than the third predetermined temperature, or in a case where the temperature of the power source 10 is equal to or higher than the third predetermined temperature based on the output value of the first temperature sensor 160.

The first controller 50 closes the second switch 174 (step S407) in a case where the output value of the first temperature sensor 160 is within a predetermined temperature range, e.g. within a range of 0 to 60° C. In this manner, the first controller 50 can permit the charge only in a case where the temperature of the power source 10 is in a temperature conditions suitable for the charge.

During the charge of the power source 10, the first controller 50 detects whether the charging unit 200 is disconnected. In a state where the charging unit 200 is connected, the first controller 50 maintains the second switch 174 in the closed state except for the case where the voltage of the power source 10 is acquired by the voltage sensor 150. This can maintain a state of being capable of charging the power source 10.

In the flows illustrated in FIGS. 13 and 14, the first controller 50 of the power source unit 110 and the second controller 250 of the charging unit 200 share the control of the charging speed of the power source 10. The first controller 50 and the second controller 250 are configured to control the charging speed based on the output values of the first temperature sensor 160 and the second temperature sensor 260, respectively, i.e., based on values related to the same physical quantity.

Specifically, the first controller 50 and the second controller 250 are configured to control the charge of the power source 10 based on the first correlation and the second correlation as illustrated in FIGS. 10 to 12. The first controller 50 and the second controller 250 are preferably configured to control the charge of the power source 10 by preferentially using the first correlation out of the first correlation and the second correlation. That is, the first correlation is preferably a correlation for determining whether to set the charging speed to "0", as illustrated in FIG. 10. In this way, the second controller 250 adjusts the charging speed to a value larger than "0," and the first controller 50 determines whether to set the charging rate to "0."

Since the first temperature sensor 160 is disposed to be closer to the power source 10 than the second temperature sensor 260, the first temperature sensor 160 can acquire more accurately the temperature of the power source 10. On the other hand, increases in weight and size of the power source unit 110 are not preferable in view of article characteristics of the flavor generation device 100 that is carried routinely by the user and that is held by a mouth of the user in use. Then, the second controller 250 makes a primary determination of the charging speed with many options based on the output value of the second temperature sensor 260. The first controller 50 makes a secondary (final)

determination of the charging speed with few options based on the output value of the first temperature sensor.

In this way, the objects to be operated for the charge of the power source 10 are properly divided into the power source unit 110 and the charging unit 200, whereby more sophisticated control of the charging speed is made possible according to the state (environment) of the power source, for example.

Furthermore, the first controller 50 and the second controller 250 may control the charge of the power source 10 without communicating with each other. Therefore, a configuration of the power source unit 110 can be simplified. Even in such a case, the first controller 50 and the second controller 250 share the control of the charging speed of the power source, whereby sophisticated control of the charging speed is made possible.

The sophisticated control of the charging speed is advantageous in the following other points. Firstly, since the power source 10 can be protected, the lifetime of the power source 10 is increased. Secondly, since the electric power supplied from the charging unit 200 is used for the charge of the power source 10 without being wasted as compared with a case where the temperature of the power source 10 is low or high or a case where the internal resistance of the power source 10 is high, the charging efficiency is improved. That is, a flavor generation system with sophisticated control of the charging speed, a method of controlling the flavor generation system, and a program have an energy-saving effect.

Control Flow 2 by Second Controller of Charging Unit

Figure 15:
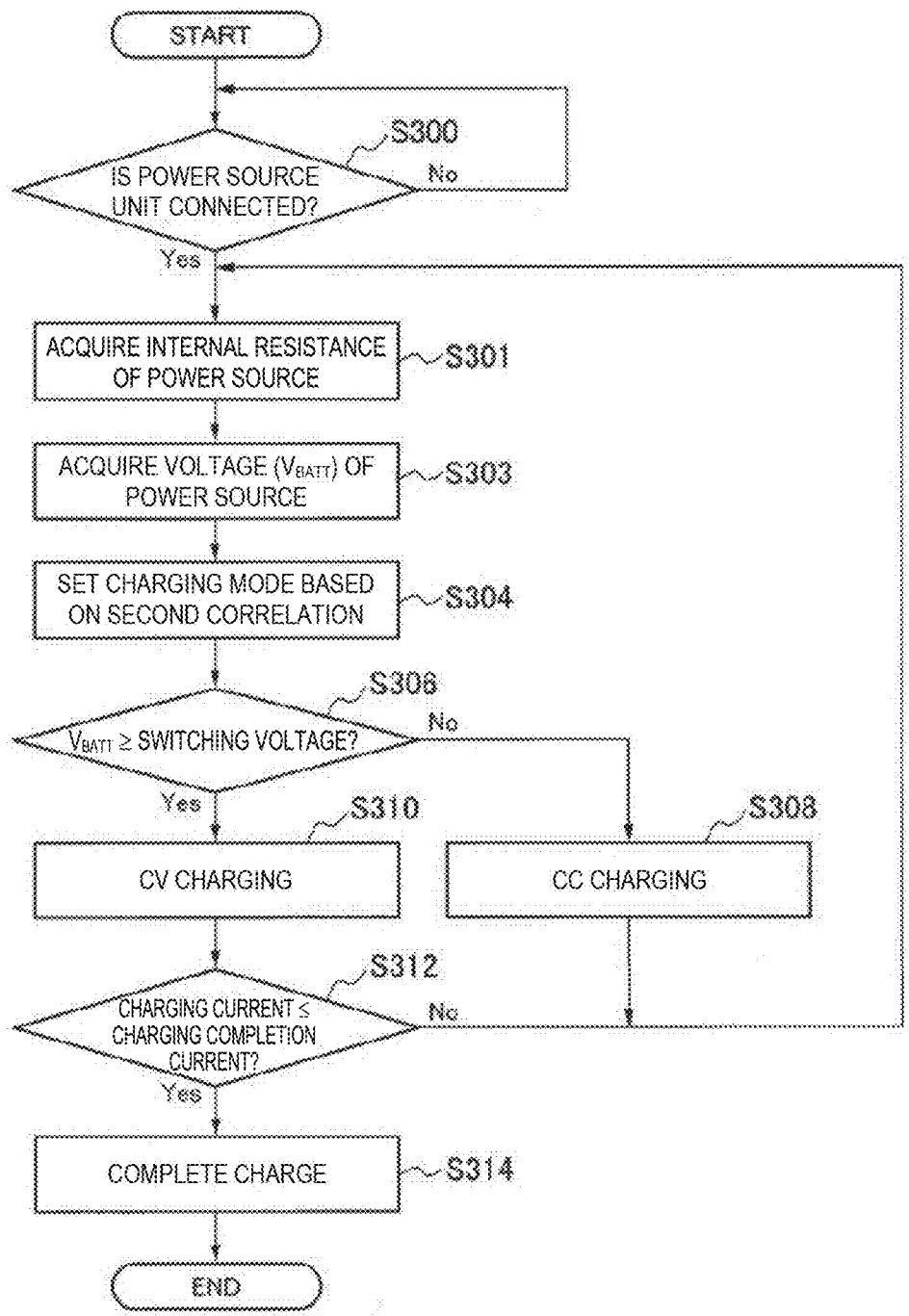
FIG. 15 is a flowchart illustrating another example of a control flow by the second controller of the charging unit.

FIG. 15 is a flowchart illustrating another example of a control flow by the second controller 250 of the charging unit 200. Hereinafter, the same reference numerals are denoted for steps similar to steps illustrated in FIG. 13, and the description thereof will be omitted.

Firstly, the second controller 250 determines whether the charging unit 200 is connected to the power source unit 110 (step S300). The second controller 250 waits until the charging unit 200 is connected to the power source unit 110.

When the charging unit 200 is connected to the power source unit 110, the second controller 250 applies a test current toward the power source unit 110, and estimates or measures an internal resistance of the power source 10 (step S301). It will be apparent to those skilled in the art that the internal resistance of the power source 10 can be obtained by dividing a value of the voltage applied to the power source unit 110 when the test current is applied by the value of the test current. In this way, the state of the power source 10 can be estimated. The second controller 250 acquires a voltage ($V_{BATT}$) of the power source 10 (step S303). Note that, in a period from step S301 to step S303, the first controller 50 of the power source unit 110 performs step S403a and step S403b described above to maintain the second switch 174 in the closed state ("on" state).

Next, the second controller 250 sets the charging mode based on the internal resistance of the power source 10 (step S304).

Subsequently, the second controller 250 determines, as necessary, which one of the constant voltage charging and the constant current charging is to be performed (step S306). Specifically, when the voltage ($V_{BATT}$) of the power source 10 is lower than the above-described switching voltage, the second controller 250 supplies the current to the power source unit 110 by the constant current charging (step S308).

Similarly, when the voltage ($V_{BATT}$) of the power source 10 is equal to or higher than the above-described switching voltage, the second controller 250 supplies the current to the power source unit 110 by the constant voltage charging (step S310). Note that the subsequent steps are the same as those in FIG. 13, and the description thereof will be omitted.

Even in a case where the second controller 250 of the charging unit 200 performs the steps illustrated in FIG. 15, the control flow by the first controller 50 may be substantially similar to the steps illustrated in FIG. 14. However, in a period from when the second controller 250 starts to apply the test current until the second controller 250 acquires the voltage of the power source 10, i.e., in the period from step S301 to step S303, the first controller 50 operates the second switch 174 to maintain it in an "on" state. Accordingly, a period from step S403a to S403b illustrated in FIG. 14 needs to be increased.

As illustrated in FIG. 15, the second controller 250 may set the charging speed based on an output value of a sensor that acquires a value having a physical quantity other than the temperature, instead of the output value of the second temperature sensor 260. Even in such a case, the first controller 50 may set the charging speed based on the output value of the first temperature sensor 160. In this way, the first controller 50 and the second controller 250 can set the charging speed based on the output values of sensors that output values related to physical quantities different from each other, respectively.

Since the first controller 50 is disposed to be close to the power source 10, the first controller 50 can acquire more accurately the temperature of the power source 10. On the other hand, increases in weight and size of the power source unit 110 are not preferable in view of article characteristics of the flavor generation device 100 that is carried routinely by the user and that is held by a mouth of the user in use. Then, the second controller 250 makes a primary determination of the charging speed with many options based on the internal resistance of the power source 10 that can be acquired accurately even away from the power source 10. The first controller 50 makes a secondary (final) determination of the charging speed with few options based on the temperature of the power source 10.

In this way, the objects to be operated for the charge of the power source 10 are properly divided into the power source unit 110 and the charging unit 200, whereby more sophisticated control of the charging speed is made possible according to the state (environment) of the power source, for example.

The sophisticated control of the charging speed is advantageous in the following other points. Firstly, since the power source 10 can be protected, the lifetime of the power source 10 is increased. Secondly, since the electric power supplied from the charging unit 200 is used for the charge of the power source 10 without being wasted as compared with a case where the temperature of the power source 10 is low or high or a case where the internal resistance of the power source 10 is high, the charging efficiency is improved. That is, a flavor generation system with sophisticated control of the charging speed, a method of controlling the flavor generation system, and a program have an energy-saving effect.

Discharge Control of Power Source

An aspect in which the charge of the power source 10 is controlled by both of the first controller 50 and the second controller 250 has been described in detail with reference to FIGS. 10 to 15. Such a concept can be also applied to an aspect in which the discharge of electric power from the power source 10 is controlled by both of the first controller 50 and the second controller 250. Here, the discharge of electric power from the power source 10 is performed in a case where an external unit other than the charging unit 200, e.g., the atomization unit 120 is connected to the connection terminals 111*t* of the power source unit 110. In this case, the external unit such as the atomization unit 120 preferably includes a controller that can control the discharge of electric power from the power source 10 to the external unit, and specifically, that can control the discharging speed.

An object to be operated by the controller provided in the external unit such as the atomization unit 120 may be different from the object to be operated by the first controller 50 of the power source unit 110. In this case, the first controller 50 controls the discharging speed of the power source by operating a first object provided in the power source unit 110 including the power source 10, and another controller provided in the external unit further controls the discharging speed by operating a second object. The discharging speed can be controlled by the above-described controllers based on similar concepts to the correlations (FIGS. 10 to 12) used for the charge control.

In addition, in this case, out of determinations to be made in the discharge, the number of first options for the determination to be made by the first controller 50 is preferably smaller than the number of second options for the determination to be made by the controller in the external unit. For example, as illustrated in FIG. 10, the first controller 50 determines whether to set the discharging speed to "0" based on the output value of the first temperature sensor 160. In this case, the number of options for the determination to be made by the first controller 50 is "2."

In a case where the external unit is the atomization unit, the controller in the external unit may perform feedback control of the temperature of the load 121R. Specifically, the controller in the atomization unit acquires the temperature of the load 121R and performs the feedback control so that the temperature of the load 121R is within a desired temperature range. The feedback control can be performed by pulse width modulating (PWM) or pulse frequency modulating (PFM) a current pulse or voltage pulse of the discharging current from the power source 10 to the atomization unit 130, for example.

Note that the desired temperature range of the feedback control need not always be fixed, and may change according to the progress of heating of the aerosol source by the load 121R. Alternatively, the atomization unit 120 includes a plurality of load 121R, and the loads 121R to which the feedback control is applied may be changed according to the progress of heating of the aerosol source, or the number of the load 121R to which the feedback control is applied may be increased or decreased. Instead of the feedback control, feed forward control may be used.

Here, the feedback control such as pulse width modulation (PWM) control or pulse frequency modulation (PFM) control can be performed by so-called PID control, for example. In the PID control, a number of determinations are required to calculate proportional control, an integral gain (I gain), and a derivative gain (D gain). Accordingly, the number of first options for the determination to be made by the first controller 50 is smaller than the number of second options for the determination to be made by the controller in the atomization unit. Similar to the sophisticated control of the charging speed, a flavor generation system with sophisticated control of the discharging speed, a method of controlling the flavor generation system, and a program have an energy-saving effect.

Note that, in the present embodiment, out of determinations to be made in the discharge, the number of first options for the determination to be made by the first controller 50 is smaller than the number of second options for the determination to be made by the controller in the external unit. Alternatively, out of determinations to be made in the discharge, the number of first options for the determination to be made by the first controller 50 may be greater than the number of second options for the determination to be made by the controller in the external unit. For example, in a case where the external unit is the atomization unit, since the first controller 50 makes the determination with many options, a configuration of the second controller 250 can be simplified. Accordingly, the cost of the atomization unit 130 that requires replacement according to the depletion of the aerosol source can be reduced.

Program and Storage Medium

The first controller 50 or the second controller 250 can perform any method described above. That is, the first controller 50 or the second controller 250 may include a program that causes the flavor generation system to execute the above-described method, and a storage medium in which such a program is stored.

OTHER EMBODIMENTS

Although the present invention has been described with reference to the above-described embodiments, it should not be understood that the invention is limited to the description and drawings constituting a part of the disclosure. From the disclosure, various alternative embodiments, example, and operational techniques will be apparent to those skilled in the art.

In the embodiments described above, for example, the flavor generation device 100 includes both of the aerosol source for generating the aerosol and the flavor source including the tobacco raw material and/or the extracts derived from the tobacco raw material for generating the smoking flavor component. Alternatively, the flavor generation device 100 may include only one of the aerosol source and the flavor source.

Note that in this specification, it should be noted that the term "flavor" may be defined as a broad concept including a smoking flavor component generated from a flavor source or an aerosol source, or a smoking flavor component derived from the flavor source or the aerosol source.

In the embodiments described above, the electric load 121R is configured to act on the aerosol source to vaporize or atomize the aerosol source. Alternatively, the electric load 121R may be configured to heat the flavor source or the flavor unit to release the flavor. In this case, the power source 10 is configured to be electrically connected to or connectable to the load 121R that heats the flavor source. Furthermore, the electric load 121R may be configured to heat both of the aerosol source and the flavor source.

Furthermore, in the control flow by the first controller 50 as described above, the first controller 50 determines whether to set the charging speed to "0" (also, see the correlation in FIG. 10). Alternatively, the first controller 50 may determine whether the charging speed is increased or decreased. For example, the first controller 50 may set the charging speed in a case where the temperature of the power source 10 is outside the predetermined temperature range slower than that in a case where the temperature of the power source 10 within the predetermined temperature range. That is, the first controller 50 may be configured to control the amount of current or electric power to be reduced or not, the current or electric power to be input to the power source 10 from the external unit such as the charging unit 200. In this way, the load applied to the power source 10 can be reduced in a case where the environment around the power source 10 is poor. Note that the reduction in the amount of current by the first controller 50 can be achieved by controlling the switch so that the current flows through a line having a higher electric resistance. Besides, the reduction in the amount of electric power by the first controller 50 can be achieved by temporarily opening the second switch 174 during the charge or temporarily opening the first switch 172 during the discharge.

The invention claimed is:

1. A flavor generation system, comprising:
a power supply that includes a power source that is electrically connected to or connectable to a load for atomizing an aerosol source or heating a flavor source, a first temperature sensor configured to output a detected value or an estimated value of a temperature sensor of the power source, and a first controller; and
a charger that includes a second temperature sensor and a second controller, the charger configured to charge the power source, wherein
the first controller and the second controller are configured to control a charging speed of the power source,
in the control of the charging speed, a first object to be operated by the first controller is different from a second object to be operated by the second controller,
the first controller is configured to provide a first correlation for setting a charging condition of the power source based on an output value of the first, temperature sensor,
the second controller is configured to provide a second correlation for setting a charging condition of the power source based on an output value of the second temperature sensor, the second correlation being different from the first correlation, and
the first controller and the second controller are configured to control a charge of the power source based on the first correlation and the second correlation.

2. The flavor generation system according to claim 1, comprising:
another sensor configured to output a detected value or an estimated value of a state of the power source, wherein
the first controller is configured to control the charging speed based on an output value of the another sensor.

3. The flavor generation system according to claim 1, wherein
the charging speed includes "0".

4. The flavor generation system according to claim 1, wherein
the power supply includes a first connector configured to be electrically connected to the charger, and a switch between the power source and the first connector, and
the first controller is configured to control the charging speed to be set to "0" or not by operating the switch.

5. The flavor generation system according to claim 4, wherein
the first controller is configured to control the charging speed to be set to "0" or not by operating the switch, based on an output value of the first temperature sensor.

6. The flavor generation system according to claim 5, wherein
the power source includes an electrolytic solution or an ionic liquid, and
the first controller is configured to open the switch in a case where the output value of the first temperature sensor is equal to or lower than a predetermined temperature, which causes solidification of the electrolytic solution or the ionic liquid, or in a case where the temperature of the power source is estimated to be equal to or lower than the predetermined temperature based on the output value of the first temperature sensor.

7. The flavor generation system according to claim 1, wherein
the charger includes a converter configured to convert a voltage or a current of input electric power and output the converted voltage or current, and
the second controller is configured to adjust a value of the voltage or the current to be output from the converter.

8. The flavor generation system according to claim 7, wherein
the second controller is configured to adjust the value of the voltage or the current to be output from the converter based on an output value of the second temperature sensor.

9. The flavor generation system according to claim 8, wherein
the second controller is configured to acquire a value related to a remaining amount of the power source, and
the second controller is configured to adjust the value of the voltage or the current to be output from the converter based on the value related to the remaining amount of the power source and the output value of the second temperature sensor.

10. The flavor generation system according to claim 8, wherein
the converter is configured to perform a first charging mode, and a second charging mode in which a value of electric power or a current per unit time that can be output by the converter is greater than that in the first charging mode, and
the second controller is configured to cause the converter to perform the second charging mode in a case where the output value of the second temperature sensor is equal to or higher than a threshold, and cause the converter to perform the first charging mode in a case where the output value of the second temperature sensor is lower than the threshold.

11. The flavor generation system according to claim 8, wherein
the second controller is configured to perform constant current charging and constant voltage charging in a case where the output value of the second temperature sensor is equal to or higher than a threshold, and perform only the constant current charging out of the constant current charging and the constant voltage charging in a case where the output value of the temperature sensor is lower than the threshold.

12. The flavor generation system according to claim 8, wherein
the second controller is configured so that a switching value which is a value related to the remaining amount of the power source when the constant current charging is switched to the constant voltage charging in a case where the output value of the second temperature sensor is lower than a threshold is smaller than the switching value in a case where the output value of the temperature sensor is equal to or higher than the threshold.

13. The flavor generation system according to claim 1, wherein
the first controller is configured to control the charging speed based on an output value of the first temperature sensor, and
the second controller is configured to control the charging speed based on an output value of the second temperature sensor.

14. The flavor generation system according to claim 1, wherein
the charger includes a second sensor other than the second temperature sensor,
the first temperature sensor and the second sensor are configured to output values related to physical quantities different from each other, respectively,
the first controller is configured to control the charging speed based on an output value of the first temperature sensor, and
the second controller is configured to control the charging speed based on an output value of the second sensor.

15. The flavor generation system according to claim 1, wherein
the power supply includes a first connector configured to be electrically connected to the charger, and a switch between the power source and the first connector,
the charger includes a converter configured to convert a current or a voltage of input electric power and output the converted current or voltage,
the second controller is configured to perform a second control to adjust a value of the voltage or the current to be output from the converter,
the first controller is configured to perform a first control to control the charging speed to be set to "0" or not by operating the switch, and
the charging speed is controlled by the first control and the second control.

16. The flavor generation system according to claim 15, wherein
the first controller is configured to perform the first control based on an output value of the first temperature sensor, and
the second controller is configured to perform the second control based on an output value of the second temperature sensor.

17. The flavor generation system according to claim 1, wherein
the first controller is configured to control an amount of current or electric power to be reduced or not, the current or electric power to be input to the power source from the charger.

18. The flavor generation system according to claim 1, wherein
the power supply and the charger are electrically connected to each other only by a main positive bus and a main negative bus.

19. A flavor generation system, comprising:
a power supply that includes a power source that is electrically connected to or connectable to a load for atomizing an aerosol source or heating a flavor source, a first temperature sensor configured to output a detected value or an estimated value of a temperature sensor of the power source, and a first controller; and
an external unit that includes a second temperature sensor and a second controller, the external unit configured to receive electric power output from the power source, wherein
the first controller and the second controller are configured to control a discharging speed from the power source,
in the control of the discharging speed, an object to be operated by the first controller is different from an object to be operated by the second controller,
the first controller is configured to provide a first correlation for setting a charging condition of the power source based on an output value of the first temperature sensor,
the second controller is configured to provide a second correlation for setting a charging condition of the power source based on an output value of the second temperature sensor, the second correlation being different from the first correlation, and
the first controller and the second controller are configured to control a charge of the power source based on the first correlation and the second correlation.

20. A flavor generation system, comprising:
a power supply that includes a power source that is electrically connected to or connectable to a load for atomizing an aerosol source or heating a flavor source, a first temperature sensor configured to output a detected value or an estimated value of a temperature sensor of the power source, and a first controller; and
an external unit that includes a second temperature sensor and a second controller, wherein
the first controller and the second controller are configured to control a charge of the power source by the external unit or a discharge of electric power from the power source to the external unit,
out of determinations to be made in the charge or the discharge, the number of first options for the determination to be made by the first controller is smaller than the number of second options for the determinations to be made by the second controller,
the first controller is configured to provide a first correlation for setting a charging condition of the over source based on an output value of the first temperature sensor,
the second controller is configured to provide a second correlation for setting a charging condition of the power source based on an output value of the second temperature sensor, the second correlation being different from the first correlation, and
the first controller and the second controller are configured to control a charge of the power source based on the first correlation and the second correlation.

* * * * *